United States Patent
Mi et al.

(10) Patent No.: US 12,279,291 B2
(45) Date of Patent: Apr. 15, 2025

(54) INFORMATION SENDING METHOD AND APPARATUS

(71) Applicant: HUAWEI TECHNOLOGIES CO., LTD., Shenzhen (CN)

(72) Inventors: Xiang Mi, Beijing (CN); Zhihu Luo, Beijing (CN); Xiaolei Tie, Shanghai (CN); Jun Li, Shanghai (CN); Zhe Jin, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 398 days.

(21) Appl. No.: 17/401,560

(22) Filed: Aug. 13, 2021

(65) Prior Publication Data

US 2021/0377954 A1    Dec. 2, 2021

Related U.S. Application Data

(63) Continuation of application No. PCT/CN2019/075274, filed on Feb. 15, 2019.

(51) Int. Cl.
*H04W 72/04* (2023.01)
*H04L 1/1812* (2023.01)
(Continued)

(52) U.S. Cl.
CPC .......... *H04W 72/53* (2023.01); *H04L 1/1819* (2013.01); *H04L 1/1874* (2013.01); *H04W 72/0453* (2013.01); *H04W 72/23* (2023.01)

(58) Field of Classification Search
None
See application file for complete search history.

(56) References Cited

U.S. PATENT DOCUMENTS

| 2015/0043481 A1* | 2/2015 | Mucke | H04L 1/1874 |
| | | | 370/329 |
| 2015/0250017 A1* | 9/2015 | Ingale | H04B 7/2615 |
| | | | 370/280 |

(Continued)

FOREIGN PATENT DOCUMENTS

| CN | 103338500 A | 10/2013 |
| CN | 106470467 A | 3/2017 |

(Continued)

OTHER PUBLICATIONS

Nokia Networks, Physical Downlink Control Channel for MTC. 3GPP TSG-RAN WG1 Meeting #81, Fukuoka, Japan, May 25 29, 2015, R1-152540, 4 pages.

(Continued)

*Primary Examiner* — Pamit Kaur
(74) *Attorney, Agent, or Firm* — Rimon PC

(57) ABSTRACT

An information sending method and an apparatus are provided. In the method, after sending a first message including uplink data to a network device, a terminal device receives first DCI from the network device, where the first DCI may include first indication information, and the first indication information is used to indicate that the network device has successfully demodulated the first message or used to indicate the terminal device to flush a HARQ buffer corresponding to the first message; and the terminal device may obtain the first indication information from the first DCI, and after obtaining the first indication information, the terminal device determines not to monitor a PDCCH search space within first duration after the first DCI. After sending the uplink data and receiving the first indication information from the network device, the terminal device may not monitor the PDCCH search space within specific duration.

12 Claims, 8 Drawing Sheets

(51) Int. Cl.
  *H04L 1/1867* (2023.01)
  *H04W 72/0453* (2023.01)
  *H04W 72/23* (2023.01)
  *H04W 72/53* (2023.01)

(56) References Cited

U.S. PATENT DOCUMENTS

| | | | |
|---|---|---|---|
| 2016/0198408 A1 | 7/2016 | Jhang et al. | |
| 2016/0277935 A1* | 9/2016 | Singh | H04W 36/06 |
| 2018/0192468 A1 | 7/2018 | Martin | |
| 2019/0044811 A1* | 2/2019 | Miao | H04L 5/001 |
| 2020/0187173 A1* | 6/2020 | Ye | H04L 41/0806 |
| 2020/0322946 A1* | 10/2020 | Jiang | H04W 72/51 |
| 2021/0136769 A1* | 5/2021 | Niu | H04W 72/0446 |

FOREIGN PATENT DOCUMENTS

| | | | |
|---|---|---|---|
| CN | 106533633 A | 3/2017 | |
| CN | 107925448 A | 4/2018 | |
| CN | 108307495 A | 7/2018 | |
| CN | 108631901 A | 10/2018 | |
| CN | 109076562 A | 12/2018 | |
| EP | 3226456 A1 | 10/2017 | |
| WO | 2014073799 A1 | 5/2014 | |
| WO | 2014183278 A1 | 11/2014 | |
| WO | 2017194022 A1 | 11/2017 | |
| WO | 2018058485 A1 | 4/2018 | |

OTHER PUBLICATIONS

3GPP TSG RAN Meeting #80, RP-181451, New WID on Rel-16 enhancements for NB-IoT, Ericsson, Huawei,La Jolla, USA, Jun. 11-14, 2018,total 4 pages.
3GPP TS 36.212 V15.4.0 (Dec. 2018), 3rd Generation Partnership Project; Technical Specification Group Radio Access Network; Evolved Universal Terrestrial Radio Access (E-UTRA); Multiplexing and channel coding(Release 15), 247 pages.
3GPP TS 36.321 V15.4.0 (Dec. 2018);3rd Generation Partnership Project;Technical Specification Group Radio Access Network;Evolved Universal Terrestrial Radio Access (E-UTRA); Medium Access Control (MAC) protocol specification (Release 15),total 131 pages.
2GPP TS 36.331 V14.9.0:"3rd Generation Partnership Project; Technical Specification Group Radio Access Network; Evolved Universal Terrestrial Radio Access (E-UTRA); Radio Resource Control (RRC); Protocol specification (Release 14)",Dec. 2018, total 773 pages.
3GPP TS 36.213 V15.4.0 (Dec. 2018), 3rd Generation Partnership Project; Technical Specification Group Radio Access Network; Evolved Universal Terrestrial Radio Access (E-UTRA); Physical layer procedures(Release 15), 551 pages.

* cited by examiner

INFORMATION SENDING METHOD AND APPARATUS

CROSS-REFERENCE TO RELATED APPLICATIONS

This application is a continuation of International Application No. PCT/CN2019/075274, filed on Feb. 15, 2019, the disclosure of which is hereby incorporated by reference in its entirety.

TECHNICAL FIELD

This application relates to the field of communications technologies, and in particular, to an information sending method and an apparatus.

BACKGROUND

Currently, in some communications systems, such as a narrowband internet of things (NB-IoT), a fifth generation (5G) network, or a new radio access (NR) system, a terminal device may send uplink data to a network device. An NB-IoT system is used as an example. After the terminal device sends the uplink data, if the network device successfully demodulates the uplink data, the network device does not send a message indicating that the demodulation is successful to the terminal device, or if the network device has downlink data that needs to be sent to the terminal device, the network device delivers the downlink data to the terminal device. For a case in which the demodulation fails, if the network device fails to demodulate the uplink data, the network device does not flip a new data indicator (NDI) sent to the terminal device, where the NDI is carried in downlink control information (DCI), and used to indicate whether the terminal device flushes a hybrid automatic repeat request (HARQ) buffer corresponding to the uplink data.

The terminal device may learn only that the network device fails to demodulate the uplink data, but cannot learn when the network device delivers the downlink data. To receive, in time and accurately, the downlink data delivered by the network device, the terminal device needs to start to monitor a physical downlink control channel (PDCCH) search space after sending the uplink data, to detect, from the PDCCH search space, scheduling information of the downlink data sent by the network device.

Actually, after demodulating the uplink data, the network device needs to interact with another network device (for example, a core network device) before sending the downlink data to the terminal device. In other words, after receiving the uplink data, the network device does not immediately send the downlink data to the terminal device. As a result, the terminal device needs to monitor the PDCCH search space for a relatively long time to receive the downlink data. A longer time for monitoring the PDCCH search space by the terminal device results in greater power consumption.

In conclusion, after the terminal device sends the uplink data, monitoring a PDCCH search space takes a relatively long time and has a relatively large power consumption.

SUMMARY

This application provides an information sending method and an apparatus, to resolve a problem in the related art that monitoring a PDCCH search space takes a relatively long time and has a relatively large power consumption after a terminal device sends uplink data.

According to a first aspect, an embodiment of this application provides an information receiving method, where the method includes: After sending a first message including uplink data to a network device, a terminal device receives first DCI from the network device, where the first DCI may include first indication information, and the first indication information is used to indicate that the network device has successfully demodulated the first message or used to indicate the terminal device to flush a HARQ buffer corresponding to the first message; and the terminal device may obtain the first indication information from the first DCI, and after obtaining the first indication information, the terminal device determines not to monitor a PDCCH search space within first duration after the first DCI.

According to the foregoing method, after sending the uplink data and receiving the first indication information from the network device, the terminal device may not monitor the PDCCH search space within a specific duration, so that duration for monitoring the PDCCH search space can be effectively reduced, thereby effectively reducing power consumption of the terminal device.

In a possible design, the first duration is duration corresponding to K PDCCH periods, where K is a positive integer, or may be zero.

According to the foregoing method, the terminal device may not monitor K PDCCH search spaces after the first DCI, the first duration is fixed duration, and K may be flexibly set based on a specific scenario, so that the method can be applied to different scenarios, thereby expanding an application range.

In a possible design, K may be preconfigured, or may be carried in the first DCI.

According to the foregoing method, K may be flexibly set, and may be transmitted to the terminal device by using the first DCI, so that the terminal device may not monitor K PDCCH search spaces subsequently.

In a possible design, a first duration is determined based on a first proportion value a second duration, and the second duration may be configured by the network device, or may be pre-agreed by the terminal device and the network device.

According to the foregoing method, the first duration may be determined in a manner other than the K, so that the manner for determining the first duration is more convenient and flexible.

In a possible design, the first proportion value may be preconfigured, or may be carried in the first DCI.

According to the foregoing method, the first proportion value may be flexibly set, and may be transmitted to the terminal device by using the first DCI, so that the terminal device may determine the first duration based on the first proportion value, and then may not monitor the PDCCH search space within the first duration.

In a possible design, the second duration is a duration of a first timer, and the duration of the first timer is a duration that is configured by the network device and that corresponds to X PDCCH periods, where X is a positive integer.

According to the foregoing method, the second duration may be a duration of a timer, and a feasible manner for determining the second duration is provided.

In a possible design, the first DCI may be DCI in format N0 or DCI in format N1.

According to the foregoing method, the first DCI may use an existing DCI format, a spare bit or a spare state in DCI in an existing format may be used to carry the first indication information, or information such as K and the first proportion value, or new DCI may be designed as the first DCI based on an existing DCI format, so that complexity of blind detection on a PDCCH by the terminal device can be effectively reduced, and the first DCI can be received in time.

In a possible design, the first DCI further includes a timing advance (Timing Advance, TA).

According to the foregoing method, the terminal device can obtain the TA in time, so that the terminal device can ensure uplink synchronization with the network device, thereby reducing inter-user interference and improving uplink transmission performance of the terminal device.

In a possible design, after the terminal device receives the first indication information from the network device, the terminal device may send a first acknowledgment response to the network device, where the first acknowledgment response is used to notify the network device that the terminal device has received the first indication information. Alternatively, the terminal device may determine not to send a first acknowledgment response to the network device.

According to the foregoing method, the terminal device may enable, by using the first acknowledgment response, the network device to learn a receiving status of the first indication information in time. The manner for not sending a first acknowledgment response can reduce signaling consumption of the terminal device, and can reduce power consumption of the terminal device.

In a possible design, after the terminal device sends the first message to the network device, and before the terminal device receives the first indication information from the network device, the terminal device may further determine not to monitor the PDCCH search space within third duration.

According to the foregoing method, after sending the first message, the terminal device may not monitor the PDCCH search space within specific duration, so that power consumption for monitoring the PDCCH search space by the terminal device can be further reduced.

In a possible design, the third duration is duration corresponding to M PDCCH periods, where M is a positive integer.

According to the foregoing method, after sending the first message, the terminal device may not monitor M PDCCH search spaces after the first message is sent.

In a possible design, the first DCI further includes second indication information, and the second indication information is used to indicate that the network device has a second message that needs to be fed back to the terminal device or that the network device does not have a second message that needs to be fed back to the terminal device. If the terminal device determines, based on the second indication information, that the second message needs to be received, the terminal device may determine not to monitor the PDCCH search space within the first duration after the first indication information.

If the terminal device determines, based on the second indication information, that the second message does not need to be received, the terminal device may directly enter a sleep state.

According to the foregoing method, the first DCI may directly notify the terminal device whether the second message exists, and a corresponding operation is selected based on the second indication information, so that power consumption of the terminal device can be reduced.

According to a second aspect, an embodiment of this application provides an information sending method, where the method includes: After receiving a first message including uplink data from a terminal device, a network device first demodulates the first message, and sends first DCI to the terminal device after the first message is successfully demodulated, where the first DCI includes first indication information, and the first indication information is used to indicate that the network device has successfully demodulated the first message or used to indicate the terminal device to flush a HARQ buffer corresponding to the first message; and after a first duration after the first DCI is sent to the terminal device, the network device may send a second message to the terminal device.

According to the foregoing method, the network device may receive the uplink data from the terminal device, and send the first indication information to the terminal device, so that the terminal device may be conveniently and quickly notified of a demodulation status of the first message, or the terminal device may be notified to flush the HARQ buffer corresponding to the first message.

In a possible design, the first duration is duration corresponding to K PDCCH periods, where K is a positive integer, or may be zero.

According to the foregoing method, the terminal device may not monitor K PDCCH search spaces after the first DCI, the first duration is fixed duration, and the K may be flexibly set based on a specific scenario, so that the method can be applied to different scenarios, thereby expanding an application range.

In a possible design, K may be preconfigured, or may be carried in the first DCI.

According to the foregoing method, K may be flexibly set, and may be transmitted to the terminal device by using the first DCI, so that the terminal device may not monitor K PDCCH search spaces subsequently.

In a possible design, the first duration is determined based on a first proportion value and second duration, and the second duration may be configured by the network device, or may be pre-agreed by the terminal device and the network device.

According to the foregoing method, the first duration may be determined in a manner other than the K, so that the manner for determining the first duration is more convenient and flexible.

In a possible design, the first proportion value may be preconfigured, or may be carried in the first DCI.

According to the foregoing method, the first proportion value may be flexibly set, and may be sent to the terminal device by using the first DCI, so that the terminal device may determine the first duration based on the first proportion value, and then may not monitor the PDCCH search space within the first duration.

In a possible design, the second duration is duration of a first timer, and the duration of the first timer is duration that is configured by the network device and that corresponds to X PDCCH periods, where X is a positive integer.

According to the foregoing method, the second duration may be duration of a timer, and a feasible manner for determining the second duration is provided.

In a possible design, the first DCI may be DCI in format N0 or DCI in format N1.

According to the foregoing method, the first DCI may use an existing DCI format, a spare bit or a spare state in DCI in an existing format may be used to carry the first indication information, or information such as the K and the first proportion value, or new DCI may be designed as the first DCI based on an existing DCI format, so that complexity of blind detection on a PDCCH by the terminal device can be effectively reduced, and the first DCI can be received in time.

In a possible design, the first DCI further includes a timing advance (TA).

According to the foregoing method, the terminal device can obtain the TA time, so that the terminal device can ensure uplink synchronization with the network device, thereby reducing inter-user interference and improving uplink transmission performance of the terminal device.

In a possible design, the first DCI further includes second indication information, and the second indication information is used to indicate that the network device has a second message that needs to be fed back to the terminal device or that the network device does not have a second message that needs to be fed back to the terminal device.

According to the foregoing method, the first DCI may conveniently, and directly notify the terminal device whether the second message exists.

According to a third aspect, an embodiment of this application further provides a communications apparatus. The communications apparatus is applied to a terminal device. For beneficial effects, refer to the descriptions in the first aspect. Details are not described herein again. The apparatus has functions of implementing the actions in the method example in the first aspect. The functions may be implemented by hardware, or may be implemented by hardware executing corresponding software. The hardware or software includes one or more modules corresponding to the foregoing functions. In a possible design, a structure of the apparatus includes a receiving unit, a processing unit, and a sending unit. These units may perform corresponding functions in the method example in the first aspect. For details, refer to the detailed descriptions in the method example. Details are not described herein again.

According to a fourth aspect, an embodiment of this application further provides a communications apparatus. The communications apparatus is applied to a network device. For beneficial effects, refer to the descriptions in the second aspect. Details are not described herein again. The apparatus has functions of implementing the actions in the method example in the second aspect. The functions may be implemented by hardware, or may be implemented by hardware executing corresponding software. The hardware or software includes one or more modules corresponding to the foregoing functions. In a possible design, a structure of the apparatus includes a receiving unit and a processing unit, and further includes a sending unit. These units may perform corresponding functions in the method example in the second aspect. For details, refer to the detailed descriptions in the method example. Details are not described herein again.

According to a fifth aspect, an embodiment of this application further provides a communications apparatus. The communications apparatus is applied to a terminal device. For beneficial effects, refer to the descriptions in the first aspect. Details are not described herein again. A structure of the communications apparatus includes a processor and a memory, and the processor is configured to support a terminal in performing corresponding functions in the method in the first aspect. The memory is coupled to the processor, and stores program instructions and data that are necessary for the communications apparatus. The structure of the communications apparatus further includes a transceiver, configured to communicate with another device.

According to a sixth aspect, an embodiment of this application further provides a communications apparatus. The communications apparatus is applied to a network device. For beneficial effects, refer to the descriptions in the second aspect. Details are not described herein again. A structure of the communications apparatus includes a processor and a memory, and the processor is configured to support a terminal in performing corresponding functions in the method in the second aspect. The memory is coupled to the processor, and stores program instructions and data that are necessary for the communications apparatus. The structure of the communications apparatus further includes a communications interface, configured to communicate with another device.

According to a seventh aspect, this application further provides a computer-readable storage medium. The computer-readable storage medium stores instructions. When the instructions are run on a computer, the computer is enabled to perform the methods in the foregoing aspects.

According to an eighth aspect, this application further provides a computer program product including instructions. When the computer program product is run on a computer, the computer is enabled to perform the methods in the foregoing aspects.

According to a ninth aspect, this application further provides a computer chip. The chip is connected to a memory, and the chip is configured to read and execute a software program stored in the memory, to perform the methods in the foregoing aspects.

DESCRIPTION OF EMBODIMENTS

Figure 1:
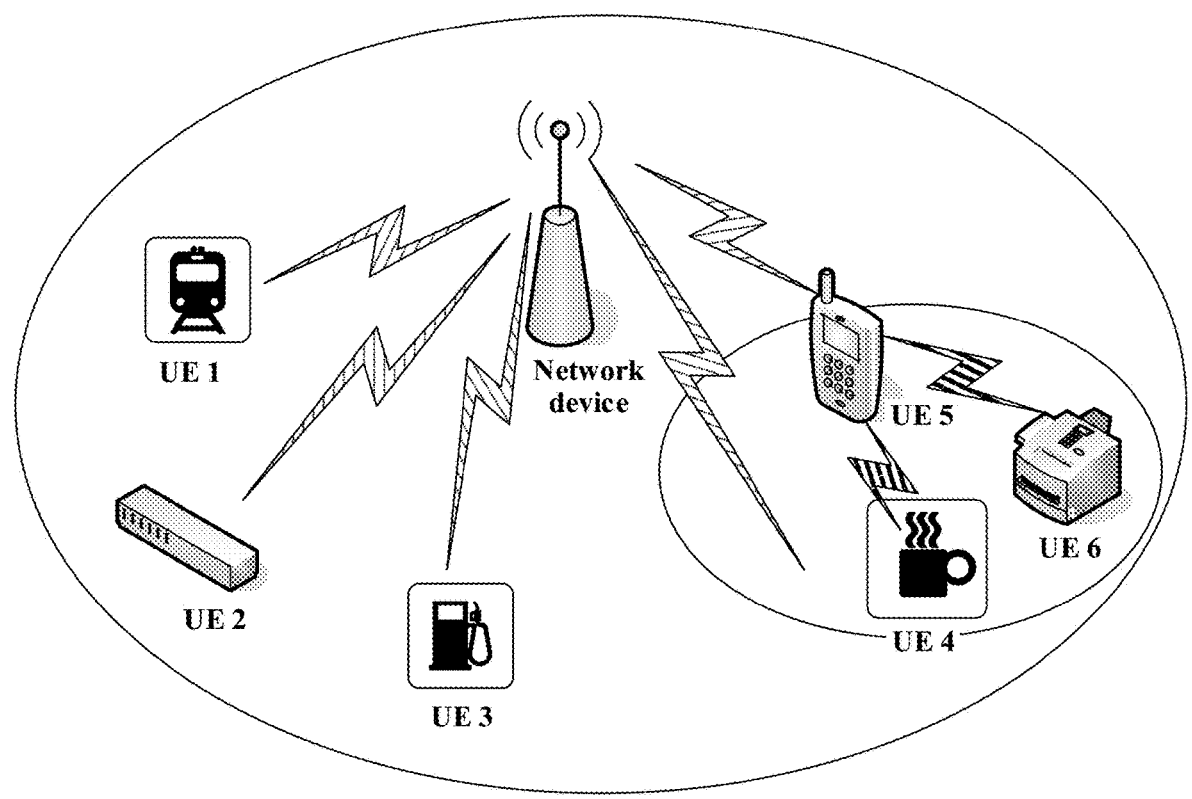
FIG. 1 is an architectural diagram of a communications system according to an embodiment of this application.

This application provides an information sending method and an apparatus, to resolve the problem in the related art that monitoring a PDCCH search space takes a relatively long time and thus has a relatively large power consumption after a terminal device sends uplink data. The method and the apparatus in this application are based on a same inventive concept. Because problem resolving principles of the method and the apparatus are similar, mutual reference may be made to implementations of the apparatus and the method. Repeated parts are not described again.

A terminal device may be a device that provides a user with voice and/or data connectivity, for example, may be a handheld device with a wireless connection function, or a processing device connected to a wireless modem. The terminal device may communicate with a core network through a radio access network (RAN), and exchange voice and/or data with the RAN. The terminal device may include user equipment (UE), a wireless terminal device, a mobile terminal device, a device-to-device (D2D) terminal device, a V2X terminal device, a machine-to-machine/machine-type communications (M2M/MTC) terminal device, an internet of things (IoT) terminal device, a subscriber unit, a subscriber station, a mobile station, a remote station, an access point (AP), a remote terminal, an access terminal, a user terminal, a user agent, a user device, or the like. For example, the terminal device may include a mobile phone (Iso referred to as a "cellular" phone), a computer with a mobile terminal device, or a portable, pocket-sized, handheld, or computer built-in mobile apparatus. For example, the terminal device may include a device such as a personal communications service (personal communication service, PCS) phone, a cordless phone, a session initiation protocol (SIP) phone, a wireless local loop (WLL) station, or a personal digital assistant (PDA). The terminal device may alternatively include a limited device, for example, a device with relatively low power consumption, a device with a limited storage capability, or a device with a limited computing capability. For example, the terminal device includes an information sensing device such as a barcode, radio frequency identification (RFID), a sensor, a global positioning system (GPS), or a laser scanner.

As an example, in the embodiments of this application, the terminal device may alternatively be a wearable device. The wearable device may also be referred to as a wearable intelligent device, an intelligent wearable device, or the like, and is a generic term for wearable devices that are developed by applying wearable technologies to intelligent designs of daily wear, such as glasses, gloves, watches, clothes, and shoes. The wearable device is a portable device that is directly worn on a body or integrated into clothes or an accessory of a user.

However, if the various terminal devices described above are located in a vehicle (for example, placed in the vehicle or mounted in the vehicle), the terminal devices may be considered as vehicle-mounted terminal devices. For example, the vehicle-mounted terminal devices are also referred to as on-board units (OBU).

A network device, for example, includes an access network (AN) device such as a base station (for example, an access point), and may be a device that is in an access network and that communicates with a wireless terminal device over an air interface through one or more cells. The base station may be configured to mutually convert a received over-the-air frame and an internet protocol (IP) packet and serve as a router between the terminal device and a rest part of the access network, where the rest part of the access network may include an IP network. The network device may further coordinate attribute management of the air interface. For example, the network device may include an evolved NodeB (NodeB, eNB, or e-NodeB, evolutional NodeB) in an LTE system or a long term evolution-advanced (LTE-A) system, may include a next generation NodeB (NodeB, gNB) in a 5th generation mobile communications technology (5G) new radio (NR) system, may include a centralized unit (CU) and a distributed unit (DU) in a cloud radio access network (Cloud RAN) system, or may include a relay device. This is not limited in the embodiments of this application.

PDCCH, is a downlink control channel sent by the network device (such as a base station) to the terminal device, and used for at least one or more of the following functions: (1) Send downlink scheduling information to the terminal device, where the downlink scheduling information is also referred to as downlink assignment information, and the downlink scheduling information includes transmission parameters of a PDSCH, so that the terminal device receives the PDSCH The PDSCH is used to carry downlink data sent by the network device to the terminal device; (2) Send uplink scheduling information to the terminal device, where the uplink scheduling information is also referred to as uplink grant information, where the uplink scheduling information includes transmission parameters of a PUSCH, so that the terminal device sends the PUSCH to the network device—the PUSCH is used to carry uplink data sent by the terminal device to the network device; (3) Send an aperiodic channel quality indicator (channel quality indicator, CQI) reporting request; (4) Send an uplink power control order, where the uplink power control command is used by the terminal device to determine a transmit power of an uplink channel; (5) Carry related information of a hybrid automatic repeat request (hybrid automatic repeat request, HARQ); and (6) Carry radio network temporary identifier (radio network temporary identifier, RNTI) information, where the RNTI information may be implicitly included in cyclic redundancy check (CRC), and the RNTI information is used by the terminal device to determine whether the PDCCH sent by the network device is sent to the terminal device.

The information carried in the PDCCH may be referred to as downlink control information (DCI). One PDCCH carries only DCI in one format scrambled by one RNTI, and the information carried in the DCI may be different based on different DCI formats and/or higher layer signaling (RRC signaling) configurations. The DCI may indicate cell-level information, for example, indicate downlink control information scrambled by the terminal device by using a system information radio network temporary identifier (SI-RNTI), a paging RNTI (P-RNTI), or a random access RNTI (RA-RNTI). The DCI may alternatively indicate terminal device-level information, for example, indicate downlink control information scrambled by the terminal device by using a cell RNTI (C-RNTI), a configured scheduling RNTI (CS-RNTI), or a semi-persistent CSI RNTI (SP CSI-RNTI).

The network device may send a plurality of PDCCHs on one control resource set, where the plurality of PDCCHs may carry the same or different control information, including scheduling information of downlink data or scheduling information of uplink data. In other words, the scheduling information may schedule downlink data of the terminal device or uplink data of the terminal device. In addition, the network device may further schedule a plurality of terminal devices in one control resource set, and each piece of scheduling information is transmitted on an independent PDCCH.

One PDCCH is sent in a form of a control-channel element (CCE). In other words, a time-frequency resource of one PDCCH includes one or two CCEs. One CCE includes 6 consecutive subcarriers in one subframe.

As shown in Table 1, a PDCCH in an NB-IoT system may support different aggregation levels (aggregation levels, ALs). For example, aggregation levels supported by the PDCCH may include {1, 2}. The aggregation level represents the number of CCEs occupied by one PDCCH candidate. As shown in Table 1, if the aggregation level supported by the PDCCH is 2, it indicates that the PDCCH candidate occupies two CCEs.

In actual application, the network device determines, based on factors such as channel quality, an aggregation level currently used by the PDCCH. For example, if a PDCCH is sent to a terminal device with good downlink channel quality (for example, a terminal device located in a cell center), the network device may send the PDCCH by using an aggregation level 1. If a PDCCH is sent to a terminal device with poor downlink channel quality (for example, a terminal device located at a cell edge), the network device may send the PDCCH by using an aggregation level 2, to achieve sufficient robustness. When one PDCCH uses the aggregation level 2, CCEs occupied by the PDCCH needs to be located in a same subframe. Compared with using the aggregation level 1, using the aggregation level 2 brings a lower bit rate and better coverage. Further coverage enhancement may be implemented through repeated transmission. The repetition number of the PDCCH is referred to as a repetition level $R \in \{1, 2, 4, 8, 16, 32, 64, 128, 512, 1024, 2048\}$.

TABLE 1

| Aggregation level | Number of CCEs |
|---|---|
| 1 | 1 |
| 2 | 2 |

4) In the NB-IoT system, the DCI carried in the PDCCH is classified into a plurality of different DCI formats, for example, format N0 (DCI format N0) and format N1 (DCI format N1).

It should be noted that, in the NB-IoT system, the PDCCH is also referred to as a narrowband physical downlink control channel (NPDCCH. The physical uplink shared channel (PUSCH) is also referred to as a narrowband physical uplink shared channel (NPUSCH) herein. When the method provided in the embodiments of this application is applied to an NB-IoT system, the PDCCH refers to an NPDCCH, and the PUSCH refers to an NPUSCH. When the method provided in the embodiments of this application is applied to other communications systems such as an LTE system, the PDCCH is a physical downlink control channel in the system, and the PUSCH is a physical uplink shared channel in the system.

Sizes of DCI in format N0 and DCI in format N1 are both 23 bits (bits), and may be both scrambled by using a C-RNTI. To distinguish different DCI formats, a flag (flag bit) may be set in the DCI. For example, one bit in the flag in the DCI may indicate a format of the DCI, and may indicate that the DCI is in format N0 or indicate that the DCI is in format N1.

The DCI in format N0 is used to transmit uplink scheduling information (UL grant), and the DCI in format N1 has two different functions. One function is used to transmit downlink scheduling information (DL grant), and the other function is used to transmit a PDCCH order, namely, used to trigger the terminal device to initiate random access, and the DCI in the function may carry a preamble index (preamble index) used for random access.

Fields included in DCI for different functions, sizes occupied by the fields, and content indicated by each field are different, and are separately described below with reference to tables.

Table 2 shows fields included in the DCI in format N0 specified in release Rel-13, the number of bits occupied by each field, whether each field has a reserved state, and content indicated by each field.

TABLE 2

| DCI format N0 (UL grant) | | | |
|---|---|---|---|
| Field | Bits | Any reserved state? | Note |
| N0/N1 flag (flag for format N0/format N1 differentiation) | 1 | No | |
| Subcarrier indication Subcarrier indication | 6 | Yes | When a subcarrier bandwidth is 3.75 kHz, the $48^{th}$ to $63^{rd}$ state values are reserved (there are 16 reserved states in total); or when a subcarrier bandwidth is 15 kHz, the $19^{th}$ to $63^{rd}$ state values are reserved (there are 45 reserved states in total). |
| Resource assignment | 3 | No | |
| Scheduling delay | 2 | No | |
| Modulation and coding scheme | 4 | Almost no | For single tone: $I_{MCS} = 0 - 10$ are used. For multi tone: $I_{MCS} = 0 - 13$ are used $I_{MCS} = 15$ is used by EDT |
| Redundancy version | 1 | No | |
| Repetition number | 3 | No | |
| New data indicator | 1 | No | |
| DCI subframe repetition number | 2 | No | |

Table 3 shows fields included in the DCI that is in format N1 specified in release Rel-13 and that is used to transmit downlink scheduling information, the number of bits occupied by each field, whether each field has a reserved state, and content indicated by each field.

TABLE 3

DCI format N1 (DL grant)

| Field | Bits | Any reserved state? | Note |
|---|---|---|---|
| N0/N1 flag (flag for format N0/format N1 differentiation) | 1 | No | |
| NPDCCH order indicator | 1 | No | |
| Scheduling delay | 3 | No | |
| Resource assignment | 3 | No | |
| Modulation and coding scheme | 4 | Yes | The $0^{th}$ to $13^{th}$ state values have been used to indicate a modulation and coding scheme, and the $14^{th}$ and $15^{th}$ state values are reserved states. |
| Repetition number | 4 | No | |
| New data indicator | 1 | No | |
| HARQ-ACK resource | 4 | No | |
| DCI subframe repetition number | 2 | No | |

Table 4 shows fields included in the DCI that is in format N1 specified in release Rel-13 and that is used for a PDCCH order, the number of bits occupied by each field, whether each field has a reserved state, and content indicated by each field.

TABLE 4

DCI format N1 (NPDCCH order)

| Field | Bits | Any reserved state? | Note |
|---|---|---|---|
| N0/N1 flag (flag for format N0/format N1 differentiation) | 1 | No | |
| NPDCCH order indicator ( | 1 | No | |
| Starting number of NPRACH repetitions | 2 | Yes | There is 1 reserved state |
| Subcarrier indication | 6 | Yes | The $48^{th}$ to $63^{rd}$ states are reserved, and there are 16 reserved states in total. |
| Carrier indication | 4 | No | |
| All the remaining bits in format N1 are set to one | | | There are 9 reserved bits. |

The PRACH is a physical random access channel. UE sets up a connection with a cell by sending a preamble on the PRACH and obtains uplink synchronization.

In the embodiments of this application, a reserved state may also be referred to as a spare state or a redundant state. One reserved state refers to a state that is not used in the current protocol and that may carry other information. Meanings indicated by the foregoing names are the same. The embodiments of this application are not limited to the several expressions. Similarly, in the embodiments of this application, a reserved bit may also be referred to as a spare bit or a redundant spare bit. One reserved bit refers to a bit that is not used in the current protocol and that may carry other information, and one bit corresponds to two states. Meanings indicated by the foregoing names are the same. The embodiments of this application are not limited to the several expressions.

To obtain downlink control information, the terminal device needs to perform blind detection on a configured aggregation level and a PDCCH candidate corresponding to the aggregation level. The network device may configure an aggregation level set. For example, an aggregation level set {1, 2} may be configured, a group of CCEs of a corresponding quantity corresponds to one PDCCH candidate, and the network device may send one PDCCH by using one PDCCH candidate. Correspondingly, the terminal device separately performs blind detection on PDCCHs whose aggregation levels are 1 and 2, to determine whether there is a PDCCH sent to the terminal device.

A set of PDCCH candidates that need to be monitored by the terminal device is referred to as a PDCCH search space. A set of PDCCH candidates corresponding to one aggregation level may be referred to as a PDCCH search space at the aggregation level. One PDCCH search space is configured with parameters such as a control resource set associated with the PDCCH search space, a PDCCH monitoring period, an aggregation level, and a quantity of PDCCH candidates corresponding to the aggregation level.

The PDCCH search space is classified into a common PDCCH search space CSS set) and a UE-specific PDCCH search space (USS set). The CSS set is used to transmit control information related to paging, a random access response (RA Response), and a broadcast control channel (BCCH). The control information is mainly cell-level common information. The information is the same for all UEs. The USS set is used to transmit control information related to a downlink shared channel(s) (DL-SCH), an uplink shared channel(s) (UL-SCH), and the like. The control information is mainly UE-level information.

In the NB-IoT system, the terminal device needs to monitor an NPDCCH candidate set to obtain DCI. The NPDCCH candidate set is referred to as an NPDCCH search space (SS), and resources of the search space are periodically distributed. The network device may indicate a period of a search space (namely, a length of a period of a search space in time domain) and a starting position of the search space in each period to the terminal device by using a system message or radio resource control (RRC) signaling, and the terminal device performs blind detection on the NPDCCH in the search space based on the indication of the network device.

Hybrid automatic repeat request (HARQ) is a technology that combines forward error correction (FEC) and an automatic repeat request (ARQ). The FEC adds redundancy information to enable a receive end to correct some errors, thereby reducing the number of retransmission times. For errors that cannot be corrected by the FEC, the receive end requests, by using an ARQ mechanism, a transmit end to resend data.

In HARQ, transmission and fast retransmission of data are implemented by separately maintaining a HARQ entity at media access control (MAC) sublayers of two ends of communication, namely, a terminal device side and a network device side. If sending uplink data to the network device, the terminal device also locally buffers the uplink data as a HARQ buffer, so that the uplink data may be resent to the network device when the network device requests the terminal device to resend data.

In the descriptions of this application, the terms "first", "second", and "third" are only used for the purpose of distinguishing a description of elements, but s not indicate or imply relative importance, or a sequence. The terms "system" and "network" in the embodiments of the present application may be used interchangeably. "A plurality of" refers to two or more.

The term "and/or" describes an association relationship for describing associated objects and represents that three relationships may exist. For example, A and/or B may represent the following three cases: Only A exists, both A and B exist, and only B exists. In addition, unless otherwise specified, the character "/" generally indicates an "or" relationship between the associated objects.

Currently, in some communications systems, a terminal device may send uplink data to a network device in many manners. The following briefly describes several common solutions.

First, a conventional manner. The terminal device sets up a (radio resource control, RRC) connection with the network device. When determining that uplink data needs to be sent to the network device, the terminal device first applies for an uplink transmission resource from the network device. The network device assigns the uplink transmission resource to the terminal device, and sends the assigned uplink transmission resource to the terminal device by using uplink transmission scheduling information. The terminal device sends the uplink data to the network device on the uplink transmission resource. After receiving the uplink data, the network device performs demodulation. After the demodulation, if there is downlink data that needs to be sent to the terminal device, the downlink data is sent to the terminal device.

In the conventional manner, there are application and assignment processes of the uplink transmission resource, and timeliness is relatively poor. To efficiently transmit the uplink data, the following two manners are proposed.

Second, an early data transmission (early data transmission, EDT) mechanism.

The EDT mechanism introduced in Rel-15 allows the terminal device to transmit a small amount of data by using a message (Msg3) in a random access process, and the transmission process ends after Msg4 is received. There is no need to enter a connected state, so that data transmission can be implemented while power consumption of the terminal device is reduced.

Third, a transmission in preconfigured UL resource (PUR) manner.

The network device may preconfigure an uplink transmission resource for the terminal device in the pre-configured uplink resource (PUR) manner. The network device may send the uplink transmission resource to the terminal device in advance in the connection set up with the terminal device, and then the terminal device releases the RRC connection, and enters a spare state. If the terminal device has uplink data that needs to be sent, the terminal device may directly send the uplink data to the network device by using the preconfigured uplink transmission resource, and does not need to perform random access, thereby reducing power consumption of the terminal device.

However, in any manner described above, after receiving the uplink data, the network device may send downlink data to the terminal device. Because the terminal device cannot determine whether the network device has sent the downlink data, in order to receive in time, the downlink data sent by the network device, after sending the uplink data, the terminal device needs to start to perform blind detection on a PDCCH search space, and detect, from the PDCCH search space, scheduling information of the downlink data sent by the network device.

However, after receiving the uplink data, the network device needs to demodulate the uplink data and further needs to interact with another network device, to determine downlink data that needs to be sent to the terminal device. In this period, a second-level delay usually exists. In this time period, the network device does not actually send downlink data to the terminal device, but the terminal device keeps monitoring the PDCCH search space, which causes unnecessary power consumption to the terminal device.

FIG. 1 is a schematic diagram of a network architecture according to an embodiment of this application. The network architecture includes a network device (for example, a base station) and a plurality of terminal devices (for example, UEs). An application scenario involved in this embodiment of this application is applicable to an NB-IoT system, or applicable to a network architecture of another communications system, for example, a Long Term Evolution (LTE) system, a 5G NR system, a global system for mobile communications (GSM), a universal mobile telecommunications system (UMTS), or a code division multiple access (CDMA) system. Certainly, this application scenario is also applicable to a communications system constituted by a plurality of terminal devices.

As shown in FIG. 1, a base station and 6 UEs: UE 1 to UE 6 are included. UE 1 to UE 6 may be terminal devices in an NB-IoT system, for example, a mobile phone, an automobile, a television, a smart household appliance, and a printer.

UE 1 to UE 6 may all send uplink data to the base station. The base station may receive the uplink data from UE 1 to UE 6. In addition, the base station may alternatively send indication information (for example, first indication information or second indication information in this embodiment of this application) to UE 1 to UE 6. If receiving the indication information, UE 1 to UE 6 may perform a corresponding operation (for example, may not monitor a PDCCH search space).

It should be noted that, a plurality of UEs may alternatively constitute one communications system. As shown in FIG. 1, UE 4 to UE 6 may constitute one communications system, UE 4 and UE 6 may send data to UE 5, and UE 5 may send indication information to UE 4 and UE 6.

The network device and at least one terminal device shown in FIG. 1 may be configured to implement the technical solutions provided in this embodiment of this application. Similarly, the two terminal devices (such as UE 5 and UE 4) shown in FIG. 1 may alternatively be configured to implement the technical solutions provided in this embodiment of this application. For ease of description, interaction between the network device and the terminal device is used as an example in this embodiment of this application. For a manner for implementing the technical solutions provided in the embodiments of this application by a communications system constituted by terminal devices, refer to this embodiment of this application. Only one of the terminal devices needs to be considered as a device that can implement functions of the network device in this embodiment of this application. The principle is similar and is not described again.

To reduce power consumption when the terminal device receives downlink data, in this embodiment of this application, after the network device receives downlink data (corresponding to a first message in this embodiment of this application) from the terminal device, and successfully demodulates the downlink data, the network device sends, to the terminal device, first DCI that carries first indication information, to notify the terminal device that the network device has successfully demodulated the downlink data or indicate the terminal device to flush a HARQ buffer corresponding to the downlink data. After receiving the first DCI, the terminal device may determine not to monitor a PDCCH search space within specific duration (corresponding to first duration in this embodiment of this application) after the first DCI. It can be learned that, according to the technical solutions provided in this embodiment of this application, after sending uplink data, the terminal device may not perform blind detection on a PDCCH within specific duration, thereby effectively reducing power consumption.

The technical features involved in the embodiments of this application are described above, and the following describes technical solutions provided in the embodiments of this application with reference to the accompanying drawings.

Figure 2:
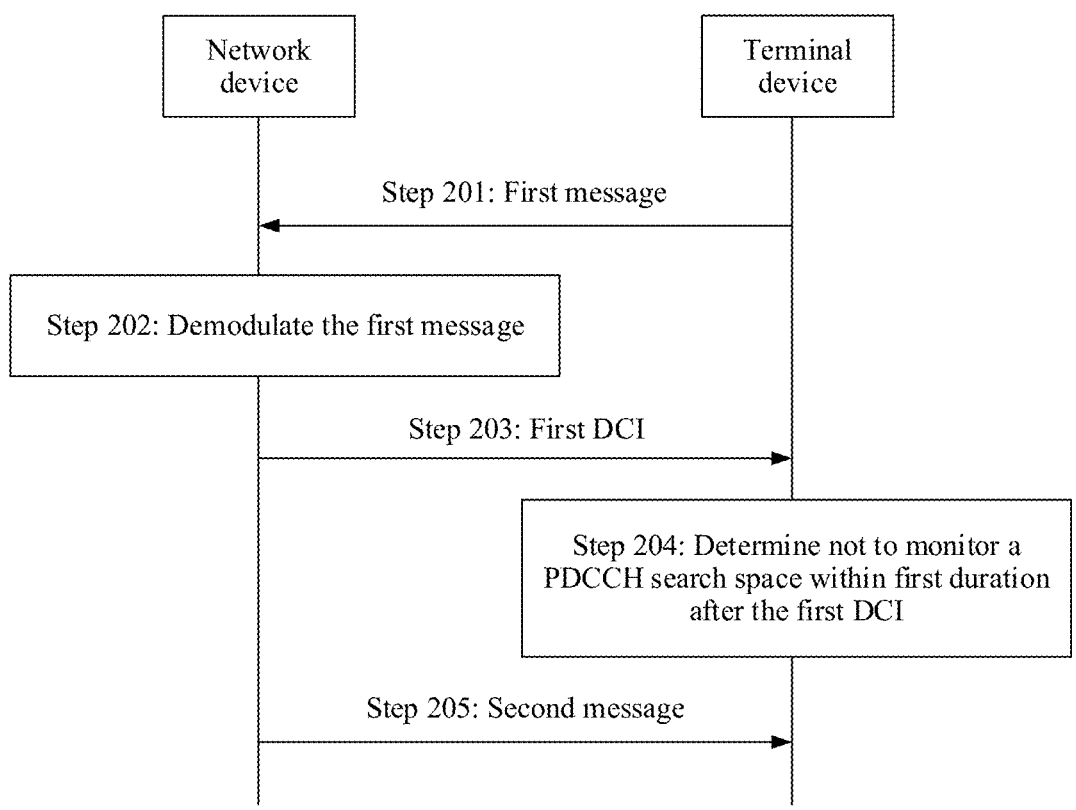
FIG. 2 is a schematic diagram of an information sending method according to an embodiment of this application.

An embodiment of this application provides an information sending method. FIG. 2 is a flowchart of the method. In the following description process, an example in which the method is applied to the network architecture shown in FIG. 1 is used.

S201: A terminal device sends a first message to a network device.

The first message may include uplink data that needs to be sent to the network device by the terminal device, and may further include another message, for example, a remaining data amount.

A manner for sending the first message to the network device by the terminal device may be any one of the foregoing three manners of sending the uplink data to the network device by the terminal device. This is not limited in this embodiment of this application.

S202: After receiving the first message from the terminal device, the network device demodulates the first message.

S203: After successfully demodulating the first message, the network device sends first DCI to the terminal device, where the first DCI includes first indication information.

S204: The terminal device receives the first DCI from the network device, and determines not to monitor a PDCCH search space within a first duration after the first DCI.

After successfully demodulating the first message, the network device may further process the first message, for example, forward the first message to another network device (for example, a network element such as an MME or an S-GW). After processing the first message, the network element such as a mobility management entity (MME) or a serving gateway (S-GW) sends a corresponding feedback to the network device, where the feedback includes whether there is downlink data to be sent to the terminal device and corresponding downlink data. After receiving the feedback sent by the network element such as an MME or an S-GW, the network device sends a second message to the terminal device, where the second message includes corresponding downlink data and some control signaling.

After the network device successfully demodulates the first message, because the network device subsequently sends the second message to the terminal device only after specific duration, in order to reduce power consumption generated by monitoring the PDCCH search space by the terminal device, the network device may send the first indication information to the terminal device, and the first indication information may be carried in one piece of DCI and represented as first DCI in this embodiment of this application.

Content indicated by the first indication information may include any one of the following two types, which are separately described below.

(1) The first indication information is used to indicate that the network device has successfully demodulated the first message.

After receiving the first indication information used to indicate that the network device has successfully demodulated the first message, the terminal device may determine that the network device has processed the first message. If a second message needs to be received by the terminal device, the network device sends the second message only after specific duration. In other words, the terminal device may determine that the network device does not send the second message to the terminal device within specific duration. In other words, the terminal device cannot detect the second message by monitoring the PDCCH search space within specific duration.

In this way, after receiving the first DCI, the terminal device may not monitor the PDCCH search space, so that power consumption of the terminal device can be better reduced.

(2) The first indication information is used to indicate the terminal device to flush a HARQ buffer corresponding to the first message.

After receiving the first message, the network device may not necessarily successfully demodulate the first message. If the network device fails to demodulate the first message, the network device may request data retransmission from the terminal device. When sending the first message, the terminal device may also locally buffer the first message. For example, the terminal device may buffer uplink data included in the first message as a HARQ buffer corresponding to the first message. When the network device requests data retransmission from the terminal device, the terminal device may resend the buffered first message to the network device.

When the first indication information indicates the terminal device to flush the HARQ buffer corresponding to the first message, it indicates that the terminal device may no longer retain the HARQ buffer corresponding to the first message, and the terminal device does not need to resend the buffered first message to the network device subsequently. From a perspective of data demodulation, the terminal device may consider that the network device has successfully demodulated the first message.

After the terminal device learns that the network device has successfully demodulated the first message, if the network device needs to send the second message subsequently, the network device needs to send the second message after specific duration. In other words, the terminal device may determine not to monitor the PDCCH search space within a specific duration.

For example, the terminal device may determine not to monitor the PDCCH search space within the first duration after the first DCI.

Herein, it should be noted that the PDCCH search space after the first DCI refers to a PDCCH search space after a search space carrying the first DCI. In other words, the PDCCH search space within the first duration after the first DCI does not include the search space carrying the first DCI. The first duration refers to a time length, and the first duration may be a specific time period, for example, 3 ms, or may be a time domain resource. The time domain resource includes but is not limited to a radio frame, a subframe, a symbol, or a slot. For example, the first duration may be a specific quantity of slots, and in the specific quantity of slots after the first DCI, the terminal device may not monitor the PDCCH search space.

The following describes two relatively common representations of the first duration.

First, the first duration is a duration corresponding to K PDCCH periods, where K is a positive integer.

The PDCCH period (PP) is a period of the PDCCH search space of the terminal device, and duration corresponding to one PDCCH period is a time interval between starting times of two PDCCH search spaces of the terminal device. For example, the duration corresponding to one PDCCH period is 1024 ms, 2048 ms, or 4096 ms.

When the first duration is the duration corresponding to the K PDCCH periods, the terminal device may not monitor K PDCCH search spaces after the first DCI, where K is a positive integer.

It should be noted that K may also be 0. When K is 0, the terminal device determines that the PDCCH search space after the first DCI needs to be monitored. For the PDCCH search space that carries the first DCI, when monitoring the PDCCH search space, the terminal device may stop blind detection on the PDCCH search space after detecting a PDCCH candidate carrying the first DCI. In this way, power consumption of the terminal device can be effectively reduced.

In an existing manner for monitoring the PDCCH search space, after sending the uplink data, the terminal device starts a timer (for example, a MAC contention resolution timer) when starting to monitor the PDCCH search space. Before the timer ends, the terminal device needs to monitor the PDCCH search space, until the timer stops or expires. In this case, the terminal device may stop monitoring the PDCCH. In this embodiment of this application, the first duration is allowed to be longer than duration of the timer started when the terminal device starts to monitor the PDCCH search space. In other words, after receiving the first DCI, the terminal device may keep not monitoring the PDCCH search space until the timer stops or expires.

Second, the first duration is determined based on one proportion value (represented as a first proportion value in this embodiment of this application) and another duration (represented as second duration in this embodiment of this application).

The first duration may be determined through specific calculation by using the first proportion value and the second duration, for example, may be a value obtained through multiplication. For example, the first proportion value is ¼, and the second duration is duration corresponding to 32 PPs. The value obtained through multiplication is duration corresponding to 8 PPs, and the first duration is the duration corresponding to the 8 PPs. The foregoing is merely an example. This application does not limit a manner for determining the first duration based on the first proportion value and the second duration. Any manner for determining the first duration based on the first proportion value and the second duration is applicable to this embodiment of this application.

The second duration may be preconfigured by the network device for the terminal device, or may be duration pre-agreed by the terminal device and the network device. In a possible implementation, the second duration may alternatively be duration of a first timer, and the duration of the first timer may be duration that is configured for the network device and corresponds to X PDCCH periods, where X is a positive integer.

For example, the first timer may be a MAC contention resolution timer, and is a timer started by the terminal device after the terminal device sends the first message to the network device. The duration of the first timer is duration that is for monitoring the PDCCH search space and that is configured by the network device for the terminal device. In an existing process of monitoring the PDCCH search space, the terminal device starts to monitor the PDCCH search space when the first timer is started, until the first timer expires or stops. However, in the manner in this embodiment of this application, the terminal device may not monitor the PDCCH search space within the first duration after the first timer is started, and after the first duration, the terminal device may start to monitor the PDCCH search space until the first timer ends.

It should be noted that, the first proportion value may alternatively be a value greater than 1, and when the second duration is greater than the duration of the first timer, if the duration of the first timer is duration that is for monitoring the PDCCH search space and that is preconfigured by the network device for the terminal device, the terminal device determines that the PDCCH search space after the first DCI needs to be monitored until the first timer ends.

The foregoing two representations of the first duration are merely examples, and the use of other manners is not limited in this application. Any representation of the first duration is applicable to this embodiment of this application.

Before determining not to monitor the PDCCH search space within the first duration after the first DCI, the terminal device needs to learn the first duration. There are many manners of learning the first duration by the terminal device, and three of them are listed below.

First, the first duration is preconfigured by the network device for the terminal device.

The network device may preconfigure the first duration for the terminal device. For example, the network device may notify the terminal device of the first duration by using a broadcast system message, or may notify the terminal device of the first duration by using dedicated RRC signaling.

With reference to the plurality of representations of the first duration, when notifying the terminal device of the first duration, the network device may send the K or the first proportion value to the terminal device. After receiving the K or the first proportion value, the terminal device may determine the first duration, and locally store the first duration.

In this manner, the first duration may be fixed duration, and different values of K may be configured in different scenarios, or different first proportion values may be configured in different scenarios. Configuration manners of the K and the first proportion value are not limited in this embodiment of this application. For example, some parameters in scenarios may be configured, so that the first duration is applicable to different scenarios, and the configuration manner is more flexible.

Second, the first duration is transmitted to the terminal device by the network device by using the first DCI.

Alternatively, the first duration may be transmitted to the terminal device while the network device sends the first indication information to the terminal device, and the first DCI may carry information indicating the first duration, for example, the K or the first proportion value, so that after receiving the first DCI, the terminal device determines the first duration based on the K or the first proportion value, and further determines not to monitor the PDCCH search space within the first duration after the first DCI.

In this manner, configuration of the first duration may be more flexible. The first duration may be configured based on a current network status, a corresponding K or a corresponding first proportion value may be determined, and may be transmitted to the terminal device by using the first DCI, so that the terminal device does not monitor K PDCCH search spaces subsequently, thereby reducing power consumption.

Third, the first duration is pre-agreed by the terminal device and the network device.

The first duration may be a fixed value in a standard protocol, namely, pre-agreed by the terminal device and the network device. The network device does not need to notify the terminal device of the first duration. After receiving the first DCI, based on the pre-agreed first duration, the terminal device may not monitor the PDCCH search space, thereby reducing power consumption caused by monitoring the PDCCH search space by the terminal device.

The first duration specified in the protocol may be an agreed K, or may be an agreed first proportion value, or may be duration of a timer. This is not limited in this embodiment of this application.

The foregoing two manners of learning the first duration are merely examples, and the use of other manners is not limited in this embodiment of this application.

In a possible implementation, the time length of the first duration may be duration estimated by the network device. For example, the network device may use an average value of a time at which the uplink data is received and a time at which a core network feeds back the downlink data to the network device, or the first duration may be determined with reference to other parameters such as a network environment, a frequency at which the terminal device interacts with the network device, and loads of the network device in different time periods. When the time length of the first duration is determined, a delay of receiving the uplink data by the network device or a delay of delivering the downlink data by the network device may also be considered. In this way, the estimated first duration can greatly reduce power consumption of the terminal device.

In another possible implementation, the time length of the first duration may alternatively be duration randomly determined by the network device, and the network device needs to ensure that the second message is not sent to the terminal device within the first duration. Even if the network device has determined, within the first duration, the second message that needs to be sent to the terminal device, the network device still needs to send the second message to the terminal device after the first duration. In this way, power consumption of the terminal device can be reduced, and the terminal device can receive the second message in time.

To enable the network device to accurately learn a receiving status of the first DCI, after receiving the first DCI, the terminal device may send a first acknowledgment response to the network device, where the first acknowledgment response is used to notify the network device that the terminal device has received the first DCI. A manner for sending the first acknowledgment response message is not limited in this embodiment of this application.

For example, the terminal device may send the first acknowledgment response to the network device by using narrowband physical uplink shared channel (narrowband physical uplink shared channel, NPUSCH) format 2. To enable the terminal device to successfully send a first acknowledgment message to the network device by using NPUSCH format 2, the network device may send scheduling information of NPUSCH format 2 to the terminal device in advance, to notify the network device of time domain resources and the like of NPUSCH format 2 that are assigned to the terminal device. This is not limited in this embodiment of this application.

By sending the first acknowledgment response, the terminal device can enable the network device to learn the receiving status of the first DCI in time, so that the terminal device and the network device can remain unified.

The scheduling information of NPUSCH format 2 sent by the network device to the terminal device may be carried in the first DCI. After receiving the first DCI, the terminal device may obtain the scheduling information of NPUSCH format 2 from the first DCI. When sending the first acknowledgment response to the network device, the terminal device may send the first acknowledgment response to the network device by using NPUSCH format 2 based on information indicated by the scheduling information of NPUSCH format 2.

For an indication manner for the scheduling information of NPUSCH format 2, the scheduling information of NPUSCH format 2 may be carried by using 4 bits according to the existing protocol (3GPP TS36.212), or another indication manner may be used, for example, a more flexible indication manner may be used. Fields of Scheduling delay, repetition number, and subcarrier index in the DCI, 8 bits in total, are used to carry the scheduling information of NPUSCH format 2, where Scheduling delay indicates a time domain starting position of transmission of NPUSCH format 2, repetition number indicates the repetition number of transmission of NPUSCH format 2, and subcarrier index indicates a subcarrier occupied by transmission of NPUSCH format 2.

Certainly, to reduce signaling consumption and reduce power consumption of the terminal device, the terminal device may alternatively not send the first acknowledgment response to the network device.

According to the foregoing descriptions, in addition to the first indication information, the first DCI may further carry a K, a first proportion value, or scheduling information of NPUSCH. To effectively use the first DCI and improve resource utilization, the first DCI may further carry a timing advance (TA). A function of the TA is to enable the terminal device to ensure uplink synchronization with the network device.

The TA is carried in the first DCI, so that the terminal device can obtain the TA in advance. This can ensure that the terminal device and the network device can better maintain uplink synchronization, reduce inter-user interference, improve uplink transmission performance of the terminal device, and improve resource utilization of the DCI.

The first DCI may be DCI transmitted by interaction between the existing network device and the terminal device, and the first indication information, the K, or the first proportion value is carried by using a spare bit or a spare state in the DCI, or the first DCI may be DCI redesigned by using an existing DCI format.

The following describes three possible formats of the first DCI and fields included in the first DCI with reference to tables.

Table 5 shows fields included in the first DCI when the first DCI is DCI in format N0, the number of bits occupied by each field, and content indicated by each field.

TABLE 5

| Field | Bits | Note |
|---|---|---|
| DCI format N0 (UL grant) | | |
| N0/N1 flag (flag for format N0/format N1 differentiation) | 1 | Keep the existing way |
| Subcarrier indication ) | 6 | When a subcarrier bandwidth is 3.75 kHz, the $48^{th}$ to $63^{rd}$ state values are reserved, and an ACK, and a K or a first proportion value may be indicated by using a total of 16 reserved states: the $48^{th}$ to $63^{rd}$ state values; or when a subcarrier bandwidth is 15 kHz, the $19^{th}$ to $63^{rd}$ state values are reserved, and an ACK, and a K or a first proportion value may be indicated by using a total of 45 reserved states: the $19^{th}$ to $63^{rd}$ state values. |
| Subcarrier index | 3 | Scheduling information of NPUSCH format 2 |
| Scheduling delay | 2 | |
| Repetition number | 3 | |
| TA | 6 | For a multi-tone transmission scheme, the TA occupies 6 bits; and for a single-tone transmission scheme, 6 bits are reserved. |
| DCI subframe repetition number | 2 | Keep the existing way |

It can be learned from Table 5 that the reserved state of the subcarrier indication in the DCI in format N0 may be used to carry the first indication information in the first DCI. Specifically, the reserved state of the subcarrier indication may indicate an ACK, represent that the network device has successfully demodulated the first message, and K or the first proportion value, and represent that the terminal device may not monitor a PDCCH search space within a first duration after the first DCI. Alternatively, 8 bits of the subcarrier index, the scheduling delay, and the repetition number in the DCI in format N0 may be used to carry the scheduling information of NPUSCH format 2. In addition, for a multi-tone transmission scheme, the TA may be indicated by using 6 bits.

In a possible implementation, the DCI in format N0 may be used to configure new DCI, and corresponding fields may be used to carry corresponding information (for example, information such as the first indication information, the K, the first proportion value, the TA, or the scheduling information of NPUSCH format 2).

The scheduling delay is used to notify the terminal device that after receiving the first DCI, the terminal device may send the first acknowledgment response after fourth duration, and a value of the scheduling delay is the fourth duration. The UE is notified to send an ACK after a specific period of time after detecting the DCI, where the specific period of time is the Scheduling delay.

A value of the scheduling delay in the existing DCI depends on a time required by the terminal device to demodulate the downlink data. A minimum value of the scheduling delay is 12 ms. It may be roughly considered that it needs to take 12 ms for the terminal device to demodulate the downlink data.

In this embodiment of this application, the terminal device needs to receive the first DCI and demodulate the first DCI to obtain the first indication information. The duration of demodulating the first DCI by the terminal device is shorter than the duration of demodulating the downlink data. In this embodiment of this application, the value of the scheduling delay may be less than 12 ms, and the minimum value may be 8 ms.

Table 6 shows fields included in the first DCI when the first DCI is DCI that is in format N1 and that is used to transmit downlink scheduling information, the number of bits occupied by each field, and content indicated by each field.

TABLE 6

DCI format N1 (DL grant)

| Field | Bits | Note |
| --- | --- | --- |
| N0/N1 flag (flag for format N0/format N1 differentiation) | 1 | Keep the existing way |
| NPDCCH order indicator | 1 | Keep the existing way |
| Modulation and coding scheme | 4 | The $0^{th}$ to $13^{th}$ state values are used to indicate a modulation and coding scheme, and the $14^{th}$ and $15^{th}$ state values are reserved. A reserved state is used to indicate that first DCI is newly configured DCI. |
| ACK, and K or first proportion value | 5 | 5 bits at most |
| TA | 6 | For a multi-tone transmission scheme, the TA occupies 6 bits; and for a single-tone transmission scheme, 6 bits are reserved. |
| HARQ-ACK resource (HARQ-ACK resource) | 4 | Keep the existing way |
| DCI subframe repetition number | 2 | Keep the existing way |

It can be learned from Table 6 that format N1 and the reserved state of the modulation and coding scheme in the DCI used to transmit downlink scheduling information may be used to carry information such as the first indication information, K, or the first proportion value. If the first DCI is newly configured DCI in format N1, information such as K or the first proportion value and the TA is determined by using corresponding fields in the DCI.

(3) Table 7 shows fields included in the first DCI when the first DCI is DCI that is in format N1 and that is used for a PDCCH order, the number of bits occupied by each field, and content indicated by each field.

TABLE 7

DCI format N1 (NPDCCH order)

| Field | Bits | Note |
| --- | --- | --- |
| N0/N1 flag (flag for format N0/format N1 differentiation) | 1 | Keep the existing way |
| NPDCCH order indicator | 1 | Keep the existing way |
| Subcarrier indication | 6 | The $48^{th}$ to $63^{rd}$ state values are reserved, and an ACK, and a K or first proportion value may be indicated by using a total of 16 reserved states: the $48^{th}$ to $63^{rd}$ state values. |
| HARQ-ACK resource | 4 | Scheduling information of NPUSCH format 2 |
| TA | 6 | For a multi-tone transmission scheme, the TA occupies 6 bits; and for a single-tone transmission scheme, 6 bits are reserved. |
| DCI subframe repetition number | 2 | |
| reserved bits | 3 | |

It can be learned from Table 7 that the reserved state of the subcarrier indication in the DCI that is in format N1 and that is used for the PDCCH order may be used to carry information such as the first indication information, K, or the first proportion value. Specifically, the reserved state of the subcarrier indication may indicate an ACK, represent that the network device has successfully demodulated the first message, and K or the first proportion value, and represent that the terminal device may not monitor a PDCCH search space within first duration after the first DCI. Alternatively, a hybrid automatic repeat request resource field in the DCI in format N1 may be used to carry scheduling information of PUSCH. In addition, for a multi-tone (multi-tone) transmission scheme, the TA may be indicated by using 6 bits.

In a possible implementation, the DCI in format N1 may be used to configure new DCI, and corresponding fields may be used to carry corresponding information (for example, information such as the first indication information, K, the first proportion value, the TA, or the scheduling information of NPUSCH format 2).

Based on the foregoing three DCI designs, the DCI in format N0 or N1 may be used as the first DCI, so that complexity of monitoring the PDCCH search space by the terminal device can be effectively reduced, and it can be ensured that the terminal device can receive the first DCI in time.

In a possible implementation, the network device may alternatively explicitly notify the terminal device whether a second message exists. For example, the network device may notify, by using the first DCI, the terminal device whether the second message exists, where the first DCI may include second indication information. The second indication information may indicate that the network device has a second message that needs to be fed back to the terminal device, or may indicate that the network device does not have a second message that needs to be fed back to the terminal device.

If the second indication information indicates that the network device has a second message that needs to feed back to the terminal device, the terminal device may learn that the PDCCH search space needs to be monitored subsequently to receive the second message.

Specifically, the PDCCH search space within the first duration after the first DCI may not be monitored, and the PDCCH search space may continue to be monitored after the first duration after the first DCI.

If the second indication information indicates that the network device does not have a second message that needs to be fed back to the terminal device, the terminal device may determine that the second message does not need to be received, and the terminal device may directly enter a sleep state, and does not monitor any PDCCH search space after the first DCI.

The sleep (sleep) state indicates that the terminal device does not detect the PDCCH, or may not send or receive another signal. Optionally, some components or modules may be selectively disabled, so that power consumption can be effectively reduced.

After sending the first DCI to the terminal device, the network device may perform S205.

S205: After the first duration after the first DCI is sent to the terminal device, the network device sends a second message to the terminal device.

It should be noted that the network device may determine, within the first duration, the second message that needs to be fed back to the terminal device, and the network device may store the second message, and send the second message to the terminal device after the first duration after the first DCI is sent.

In the foregoing method embodiment, that the terminal device does not monitor the PDCCH search space may alternatively be described in another manner. For example, the terminal device does not blindly detect the PDCCH, and the terminal device may not monitor a set of PDCCH candidates. This is not limited in this embodiment of this application. Meanings indicated by the expressions are the same. For ease of description, in this embodiment of this application, the expressions are collectively referred to as "the terminal device does not monitor the PDCCH search space". In this embodiment of this application, the PDCCH may be a conventional physical downlink control channel, for example, a PDCCH in an LTE system or a 5G system, or may be a narrowband physical downlink control channel (narrowband physical downlink control channel, NPDCCH) in NB-IoT. This is not limited in this embodiment of this application. Correspondingly, that the terminal device monitors the PDCCH search space may also be described in another manner, for example, the terminal device monitors the PDCCH and the terminal device monitors a set of PDCCH candidates (candidate). Meanings indicated by the expression manners are the same. For ease of description, in this embodiment of this application, the expressions are collectively referred to as "monitor the PDCCH search space".

In a possible implementation, after sending the first message, the terminal device may alternatively not monitor the PDCCH search space within specific duration (represented as third duration in this embodiment of this application). For example, the third duration is duration corresponding to M PDCCH periods, where M is a positive integer.

The M value may be specified in a protocol, or may be transmitted to the terminal device by the network device in advance. For example, the network device may send the M value to the terminal device by using a system message.

The M value may be an empirical value, for example, may be determined based on duration within which the network device receives the first message and successfully demodulates the first message after the terminal device sends the first message.

The M value may be preset between the network device and the terminal device, or the M value may not be set. For the two cases, the following describes the information sending method provided in this embodiment of this application.

First, the M value is not set.

Figure 3:
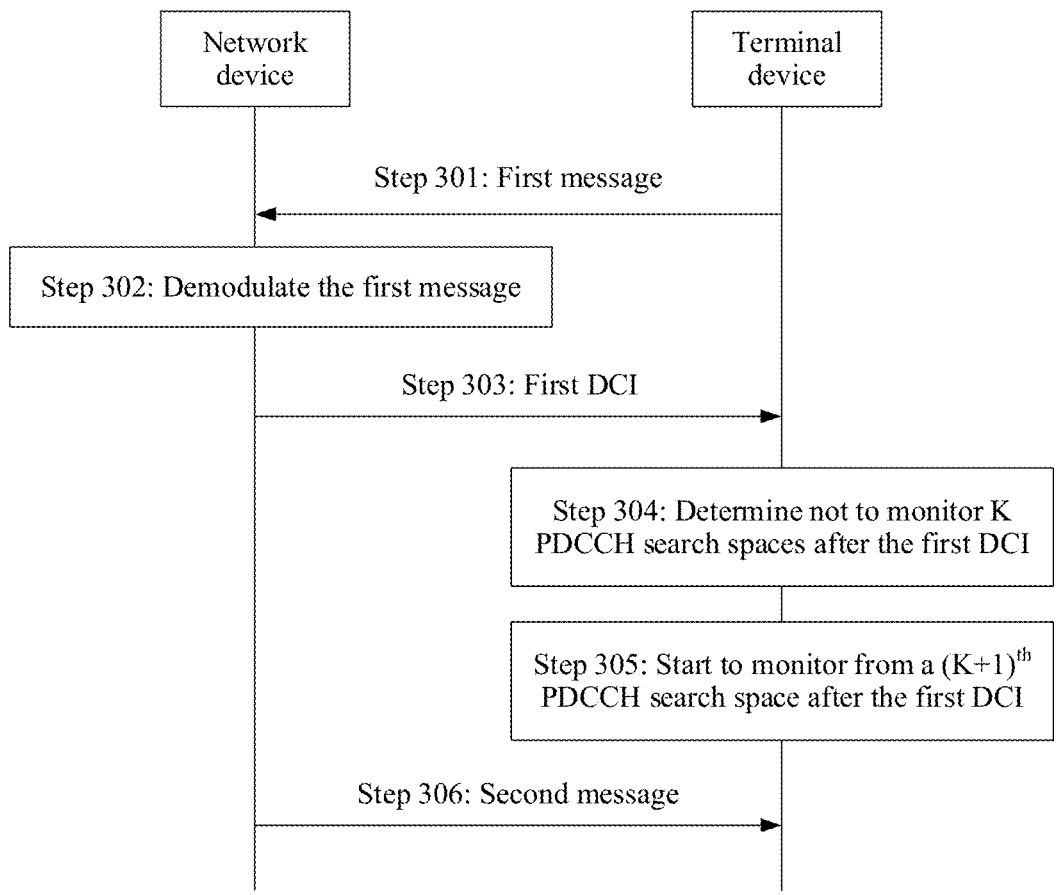
FIG. 3 is a schematic diagram of an information sending method according to an embodiment of this application.

FIG. 3 shows an information sending method according to an embodiment of this application. The method includes the following steps.

S301: A terminal device sends a first message to a network device.

After sending the first message, the terminal device monitors a PDCCH search space, and performs blind detection on all PDCCH candidates in the PDCCH search space.

S302: After receiving the first message from the terminal device, the network device demodulates the first message.

S303: After successfully demodulating the first message, the network device sends first DCI to the terminal device.

The first DCI includes first indication information, and the first indication information is used to indicate that the network device has successfully demodulated the first message.

S304: The terminal device receives the first DCI from the network device, and does not monitor K PDCCH search spaces after the first DCI.

S305: The terminal device starts to monitor from a $(K+1)^{th}$ PDCCH search space after the first DCI.

S306: The network device sends a second message to the terminal device.

Figure 4:
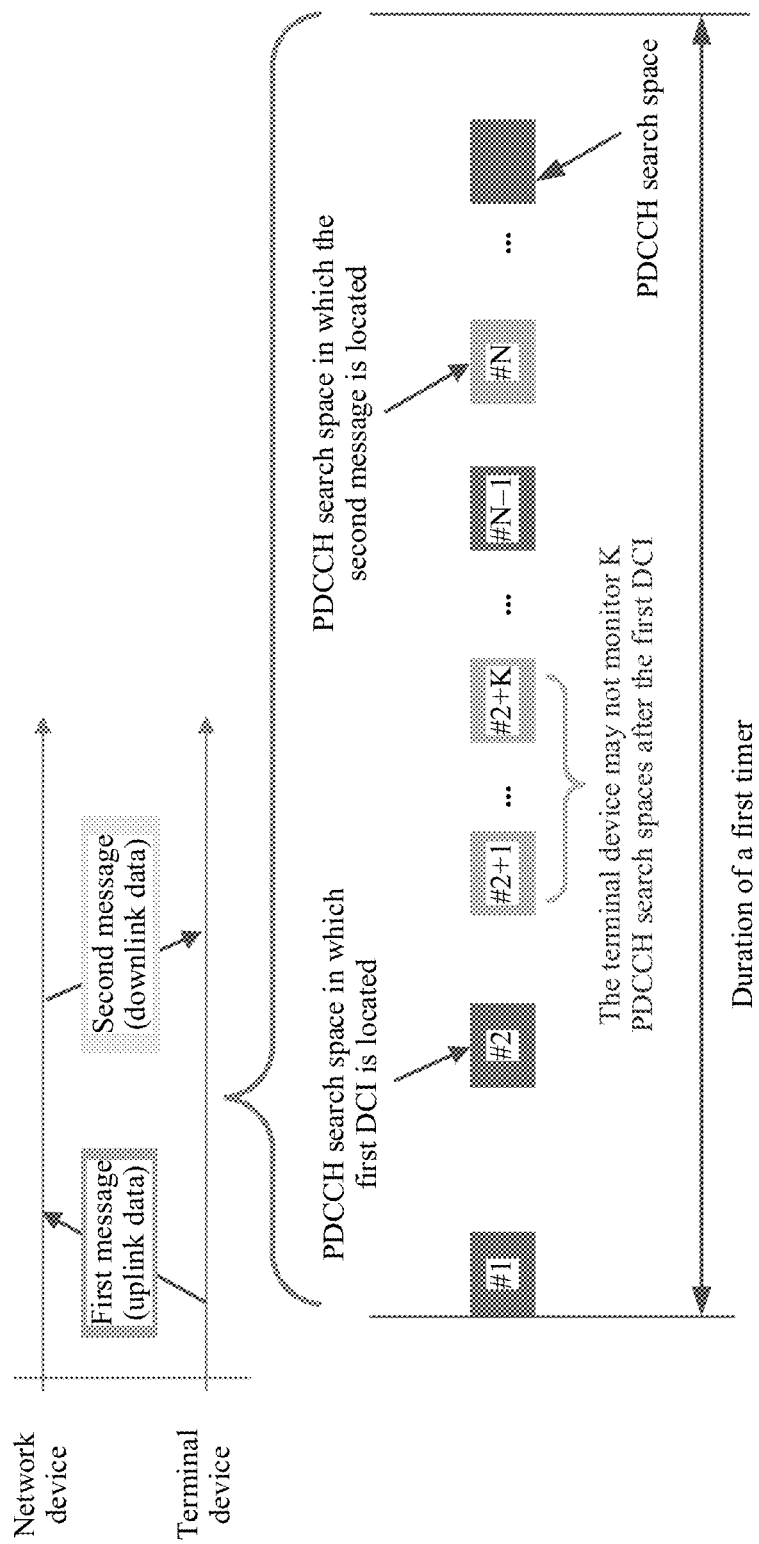
FIG. 4 is a schematic diagram of monitoring a PDCCH search space according to an embodiment of this application.

FIG. 4 shows a monitoring status of the terminal device for the PDCCH search space after the first message is sent. As shown in FIG. 4, numbers of PDCCH search spaces after the first message is sent are respectively #1, #2, #3, . . . #K+2, . . . #N.

The PDCCH search space numbered #1 is the first PDCCH search space that may be received after the terminal device sends the first message; and the PDCCH search space numbered #2 is a PDCCH search space in which the first DCI is located. Therefore, the PDCCH search spaces numbered #3 to #K+2 are K PDCCH search spaces after the first DCI; and the PDCCH search space numbered #N is a PDCCH search space in which the second message is located.

After sending the first message, the terminal device starts to monitor the PDCCH search space numbered #1 and the subsequent PDCCH search spaces, and receives the first DCI when monitoring the PDCCH search space numbered #2. Therefore, the terminal device does not monitor the PDCCH search spaces numbered #3 to #K+2, and starts to monitor from the PDCCH search space numbered #K+3, and may receive the second message when monitoring the PDCCH search space numbered #N.

It can be learned that after sending the uplink data, if the terminal device receives the first DCI, the terminal device may not monitor the K PDCCH search spaces, and start to monitor from the PDCCH search space after the K PDCCH search spaces. Compared with a manner for starting to monitor the PDCCH search space when the uplink data is sent, power consumption can be effectively reduced.

Second, the M value is set.

Figure 5:
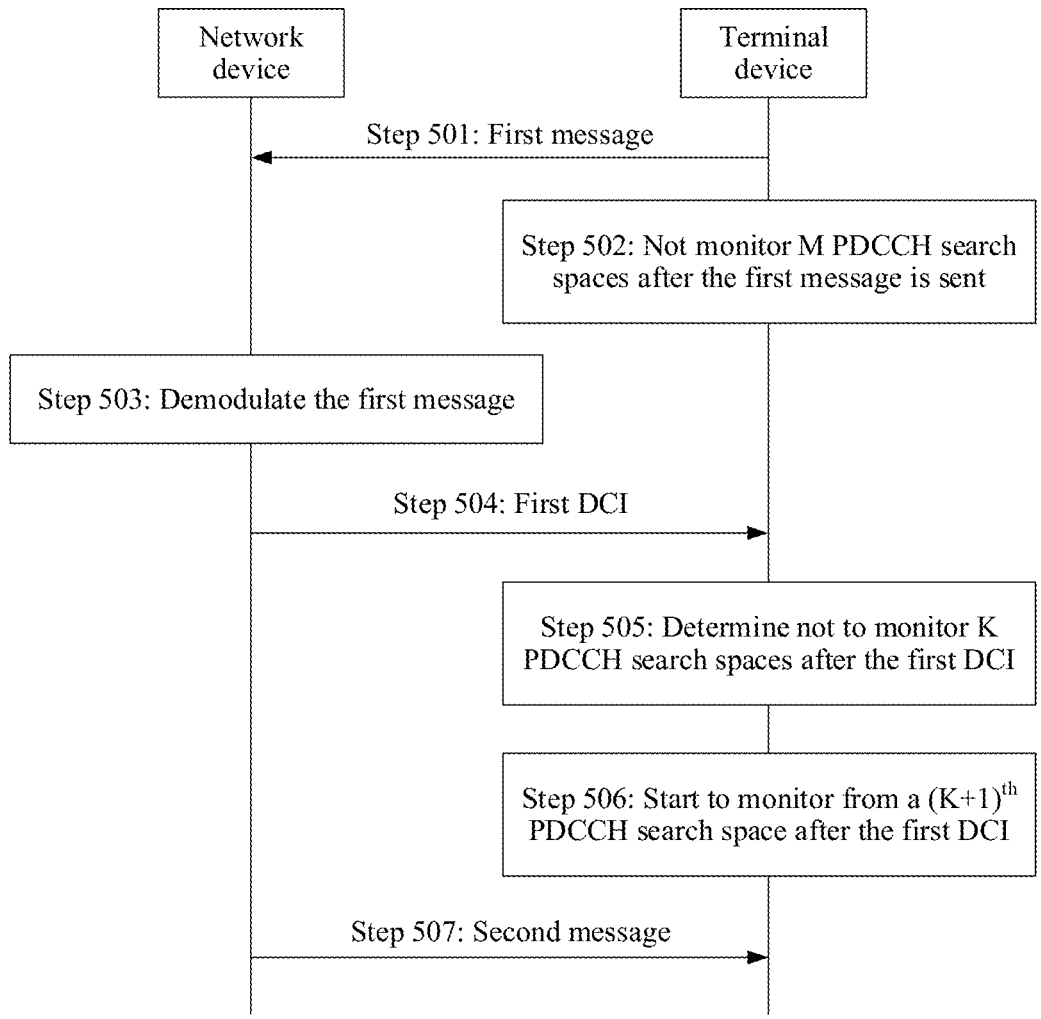
FIG. 5 is a schematic diagram of an information sending method according to an embodiment of this application.

FIG. 5 shows an information sending method according to an embodiment of this application. The method includes the following steps.

S501: A terminal device sends a first message to a network device.

S502: The terminal device does not monitor M PDCCH search spaces after the first message is sent.

S503: After receiving the first message from the terminal device, the network device demodulates the first message.

S504: After successfully demodulating the first message, the network device sends first DCI to the terminal device.

The first DCI includes first indication information, and the first indication information is used to indicate that the network device has successfully demodulated the first message.

S505: The terminal device receives the first DCI from the network device, and does not monitor K PDCCH search spaces after the first DCI.

S506: The terminal device starts to monitor from a $(K+1)^{th}$ PDCCH search space after the first DCI.

S507: The network device sends a second message to the terminal device.

Figure 6:
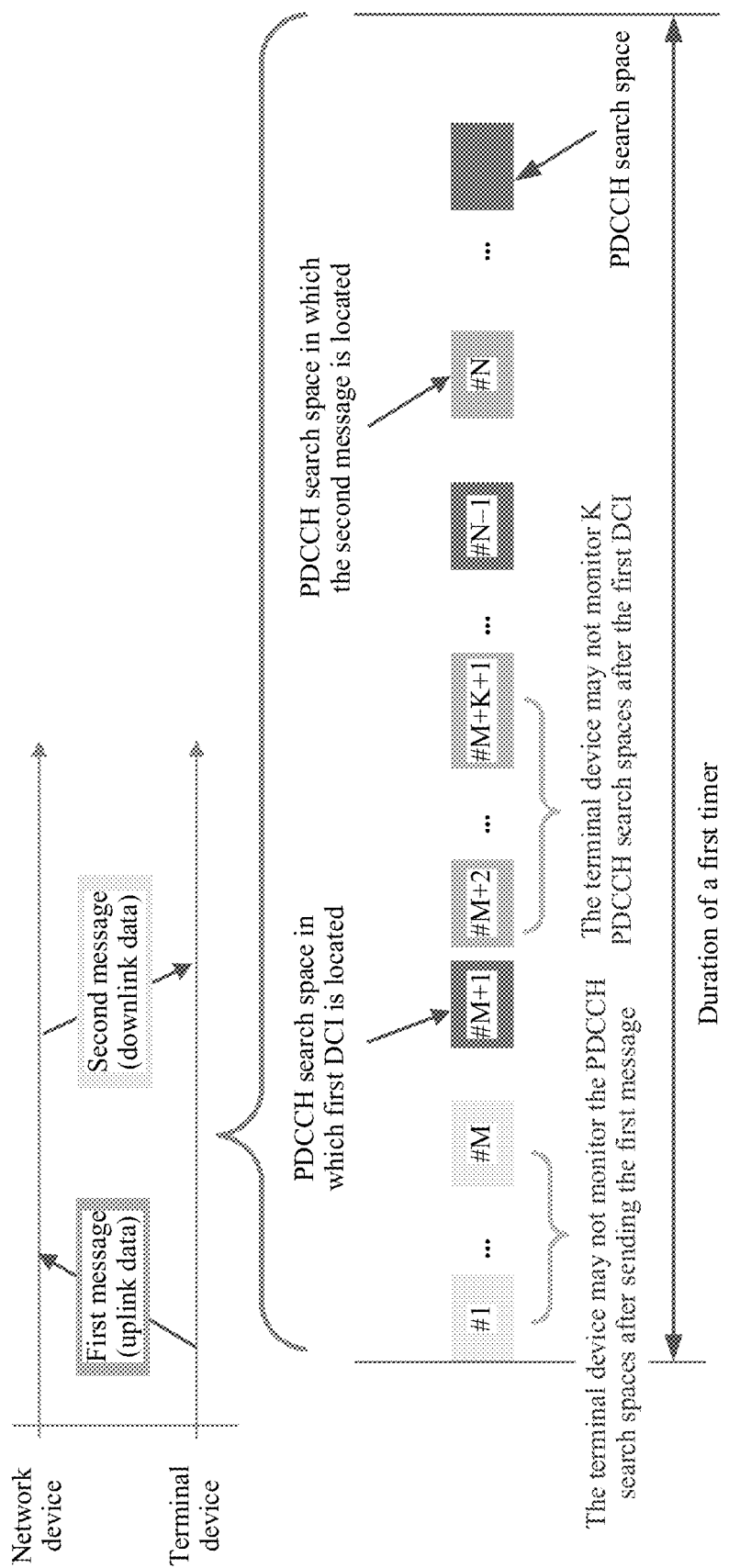
FIG. 6 is a schematic diagram of monitoring a PDCCH search space according to an embodiment of this application.

FIG. 6 shows a monitoring status of the terminal device for the PDCCH search space after the first message is sent. As shown in FIG. 6, numbers of the PDCCH search spaces after the first message is sent are respectively #1 ... #M, #M+1, #M+2 ... #M+K+1 ... #N−1, and #N.

The PDCCH search space numbered #1 is the first PDCCH search space that may be received after the terminal device sends the first message; and the PDCCH search space numbered #M+1 is a PDCCH search space in which the first DCI is located. Therefore, the PDCCH search spaces numbered #M+2 to #M+K+1 are K PDCCH search spaces after the first DCI; and the PDCCH search space numbered #N is a PDCCH search space in which the second message is located.

After sending the first message, the terminal device does not monitor a total of M PDCCH search spaces numbered #1 to #M, starts to monitor the PDCCH search spaces numbered #M+1, receives the first DCI when monitoring the PDCCH search space numbered #M+1, and subsequently does not monitor the PDCCH search spaces numbered #M+1 to #M+K+1; and starts to monitor from the PDCCH search space numbered #M+K+2, and may receive the second message when monitoring the PDCCH search space numbered #N.

It can be learned that after sending the uplink data, the terminal device may not monitor the M PDCCH search spaces. If receiving the first DCI subsequently, the terminal device also does not need to monitor the K PDCCH search spaces after the first DCI. On a basis of the embodiment shown in FIG. 3, the terminal device may not monitor the M PDCCH search spaces, so that power consumption can be further reduced to a greater extent.

Figure 7:
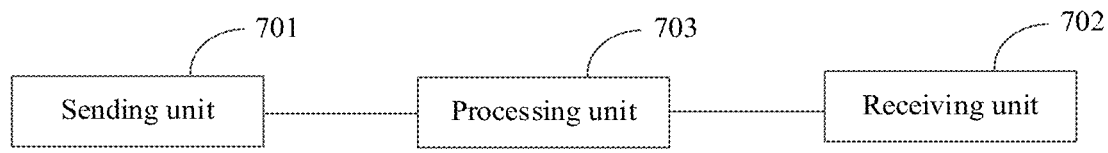
FIG. 7 is a structural diagram of a communications apparatus according to an embodiment of this application.

Based on a same inventive concept as the method embodiments, an embodiment of this application further provides a communications apparatus, configured to perform the method performed by the terminal device in the foregoing method embodiments. For a related feature, refer to the foregoing method embodiments. Details are not described herein again. As shown in FIG. 7, the apparatus includes a sending unit 701, a receiving unit 702, and a processing unit 703.

The sending unit 701 is configured to send a first message to a network device.

The receiving unit 702 is configured to: after the sending unit 701 sends the first message to the network device, receive first DCI from the network device, where the first DCI includes first indication information, and the first indication information is used to indicate that the network device has successfully demodulated the first message or used to indicate the terminal device to flush a HARQ buffer corresponding to the first message.

The processing unit 703 is configured to: after the receiving unit 702 receives the first indication information, determine not to monitor a physical downlink control channel PDCCH search space within first duration after the first DCI.

In a possible implementation, the first duration is duration corresponding to K PDCCH periods, where K is a positive integer, or may be zero.

In a possible implementation, the K may be preconfigured, for example, the network device may notify the terminal device of the K in advance; or the K may be carried in the first DCI.

In a possible implementation, the first duration is determined based on a first proportion value and second duration.

In a possible implementation, the first proportion value may be preconfigured, for example, the network device may send information carrying the first proportion value to the receiving unit 702 in advance. In another possible implementation, the first proportion value may alternatively be carried in the first DCI.

In a possible implementation, the second duration is duration of a first timer, and the duration of the first timer is duration that is configured by the network device and that corresponds to X PDCCH periods, where X is a positive integer.

In a possible implementation, the first DCI is DCI in format N0 or N1.

In a possible implementation, the first DCI may further carry other information. For example, the first DCI may further include a timing advance.

In a possible implementation, after the sending unit 701 sends the first message to the network device and before the receiving unit 702 receives the first indication information from the network device, the processing unit 703 may further determine not to monitor a PDCCH search space within third duration.

In a possible implementation, the third duration is duration corresponding to M PDCCH periods, where M is a positive integer.

In a possible implementation, the first DCI further includes second indication information, and the second indication information is used to indicate that the network device has a second message that needs to be fed back to the terminal device or that the network device does not have a second message that needs to be fed back to the terminal device.

If the processing unit 703 determines, based on the second indication information, that the second message needs to be received, the processing unit 703 may determine not to monitor the PDCCH search space within the first duration after the first indication information.

If the processing unit 703 determines, based on the second indication information, that the second message does not need to be received, the terminal device may enter a sleep state.

In a possible implementation, after the receiving unit 702 receives the first indication information from the network device, the sending unit 701 may send a first acknowledgment response to the network device, where the first acknowledgment response is used to notify the network device that the terminal device has received the first indication information. Alternatively, the sending unit 701 may determine not to send the first acknowledgment response to the network device.

Figure 8:
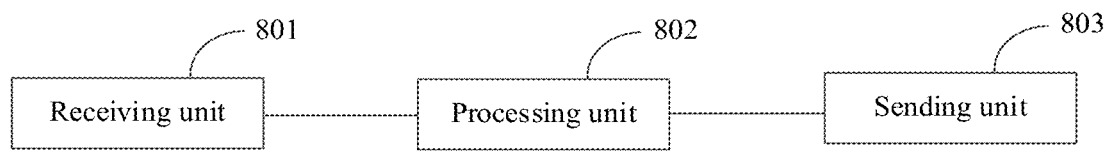
FIG. 8 is a structural diagram of a communications apparatus according to an embodiment of this application.

Based on a same inventive concept as the method embodiments, an embodiment of this application further provides a communications apparatus, configured to perform the method performed by the network device in the foregoing method embodiments. For a related feature, refer to the foregoing method embodiments. Details are not described herein again. As shown in FIG. 8, the apparatus includes a receiving unit 801, a processing unit 802, and a sending unit 803.

The receiving unit 801 is configured to receive a first message from a terminal device.

The processing unit 802 is configured to: after the receiving unit 801 receives the first message from the terminal device, demodulate the first message.

The sending unit 803 is configured to: after the processing unit 802 successfully demodulates the first message, send first downlink control information DCI to the terminal device, where the first DCI includes first indication information, and the first indication information is used to indicate that the network device has successfully demodulated the first message or used to indicate the terminal device to flush a hybrid automatic repeat request HARQ buffer corresponding to the first message.

The sending unit 803 is further configured to: after first duration after the first DCI is sent to the terminal device, send a second message to the terminal device.

In a possible implementation, the first duration is duration corresponding to K PDCCH periods, where K is a positive integer.

In a possible implementation, the K may be preconfigured, or may be carried in the first DCI.

In a possible implementation, the first duration is determined based on a first proportion value and second duration.

In a possible implementation, the first proportion value may be preconfigured, for example, the sending unit 803 may send information carrying the first proportion value to the terminal device in advance. In another possible implementation, the first proportion value may alternatively be carried in the first DCI.

In a possible implementation, the second duration is duration of a first timer, and the duration of the first timer is duration that is configured by the network device and that corresponds to X PDCCH periods, where X is a positive integer.

In a possible implementation, the first DCI is DCI in format N0 or N1.

In a possible implementation, the first DCI may further carry other information. For example, the first DCI may further include a timing advance.

In a possible implementation, the first DCI may further include second indication information, and the second indication information is used to indicate that the network device has a second message that needs to be fed back to the terminal device or that the network device does not have a second message that needs to be fed back to the terminal device.

In a possible implementation, after the sending unit 803 sends the first indication information to the terminal device, the receiving unit 801 may receive a first acknowledgment response from the terminal device, where the first acknowledgment response is used to notify the network device that the terminal device has received the first indication information.

It should be noted that, in the embodiments of this application, unit division is an example, and is merely logical function division. During actual implementation, another division manner may be used. Function units in the embodiments of this application may be integrated into one processing unit, or each of the units may exist alone physically, or two or more units may be integrated into one unit. The integrated unit may be implemented in a form of hardware, or may be implemented in a form of a software function unit.

When the integrated unit is implemented in the form of a software function unit and sold or used as an independent product, the integrated unit may be stored in a computer-readable storage medium. Based on such an understanding, the technical solutions of this application essentially, or the part contributing to the current technology, or all or some of the technical solutions may be implemented in a form of a software product. The computer software product is stored in a storage medium and includes several instructions for instructing a computer device (which may be a personal computer, a server, or a network device) or a processor (processor) to perform all or some of the steps of the methods described in the embodiments of this application. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

Figure 9:
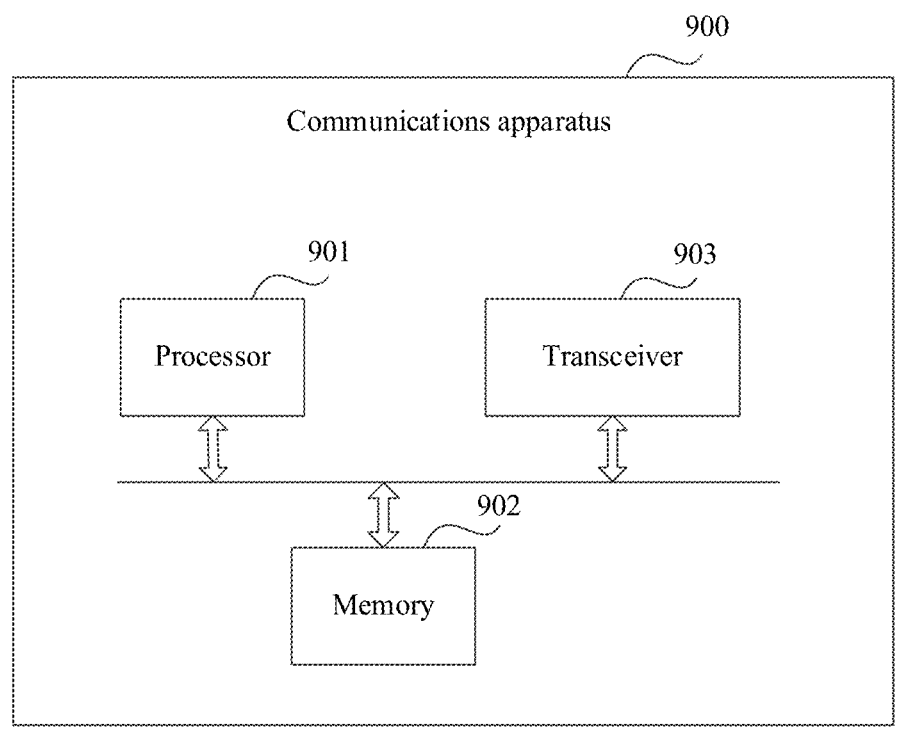
FIG. 9 is a structural diagram of a communications apparatus according to an embodiment of this application.

In a simple embodiment, a person skilled in the art may figure out that the terminal device may be in a form shown in FIG. 9.

A communications apparatus 900 shown in FIG. 9 includes at least one processor 901 and a memory 902, and optionally, may further include a transceiver 903.

The memory 902 may be a volatile memory such as a random access memory. Alternatively, the memory may be a non-volatile memory such as a read-only memory, a flash memory, a hard disk drive (hard disk drive, HDD), or a solid-state drive (solid-state drive, SSD). Alternatively, the memory 902 is any other medium that can be used to carry or store expected program code in an instruction form or a data structure form and that can be accessed by a computer, but is not limited thereto. The memory 902 may be a combination of the memories.

In this embodiment of this application, a specific connection medium between the processor 901 and the memory 902 is not limited.

The processor 901 may have a data transceiver function, and can communicate with another device. In the apparatus shown in FIG. 9, an independent data transceiver module, for example, the transceiver 903, may also be disposed and is configured to receive and send data. When communicating with the another device, the processor 901 may transmit data through the transceiver 903.

When the terminal device is in the form shown in FIG. 9, the processor 901 in FIG. 9 may invoke computer-executable instructions stored in the memory 902, to enable the terminal device to perform the method performed by the terminal device in any one of the foregoing method embodiments.

Specifically, functions/implementation processes of the sending unit, the receiving unit, and the processing unit in FIG. 7 may be implemented by the processor 901 in FIG. 9 by invoking the computer-executable instructions stored in the memory 902. Alternatively, functions/implementation processes of the processing unit in FIG. 7 may be implemented by the processor 901 in FIG. 9 by invoking computer-executable instructions stored in the memory 902, and functions/implementation processes of the sending unit and the receiving unit in FIG. 7 may be implemented through the transceiver 903 in FIG. 9.

Figure 10:
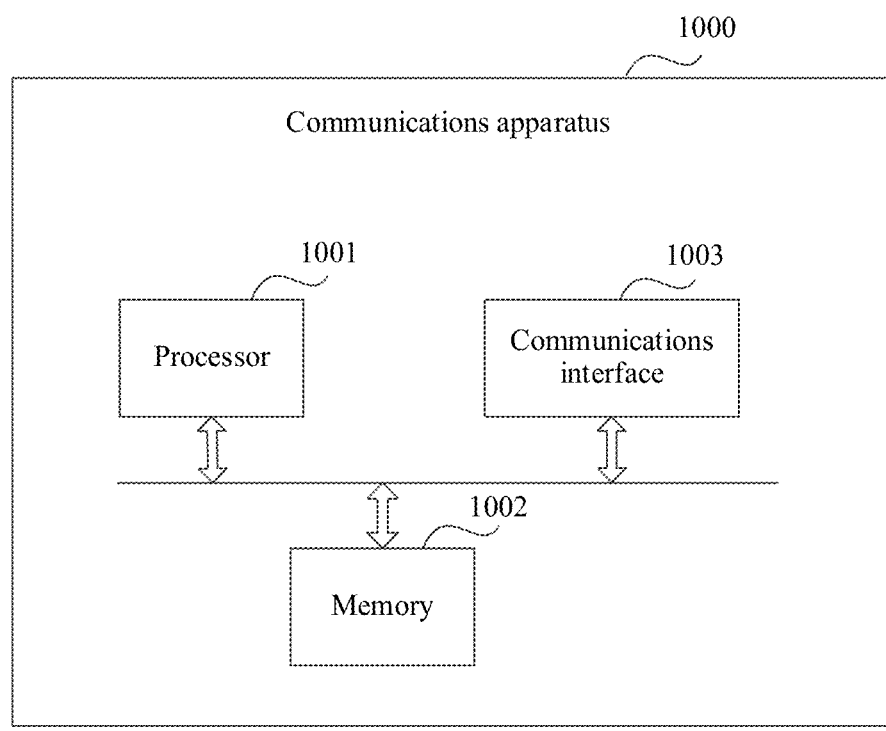
FIG. 10 is a structural diagram of a communications apparatus according to an embodiment of this application.

In a simple embodiment, a person skilled in the art may figure out that the network device may be in a form shown in FIG. 10.

A communications apparatus 1000 shown in FIG. 10 includes at least one processor 1001 and a memory 1002, and optionally, may further include a communications interface 1003.

The memory 1002 may be a volatile memory such as a random access memory. Alternatively, the memory may be a non-volatile memory such as a read-only memory, a flash memory, a hard disk drive (hard disk drive, HDD), or a solid-state drive (solid-state drive, SSD). Alternatively, the memory 1002 is any other medium that can be used to carry or store expected program code in an instruction form or a data structure form and that can be accessed by a computer, but is not limited thereto. The memory 1002 may be a combination of the foregoing memories.

A specific connection medium between the processor 1001 and the memory 1002 is not limited in this embodiment of this application.

The processor 1001 may have a data transceiver function, and can communicate with another device. In the apparatus shown in FIG. 10, an independent data transceiver module, for example, the communications interface 1003, may also be disposed and is configured to receive and send data. When communicating with another device, the processor 1001 may transmit data through the communications interface 1003.

When the network device is in the form shown in FIG. 10, the processor 1001 in FIG. 10 may invoke computer-executable instructions stored in the memory 1002, to enable the network device to perform the method performed by the network device in any one of the foregoing method embodiments.

Specifically, functions/implementation processes of the sending unit, the receiving unit, and the processing unit in FIG. 8 may be implemented by the processor 1001 in FIG. 10 by invoking the computer-executable instructions stored in the memory 1002. Alternatively, functions/implementation processes of the processing unit in FIG. 8 may be implemented by the processor 1001 in FIG. 10 by invoking computer-executable instructions stored in the memory 1002, and functions/implementation processes of the sending unit and the receiving unit in FIG. 8 may be implemented through the communications interface 1003 in FIG. 10.

A person skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer usable storage media (including but not limited to a disk memory, a CD-ROM, an optical memory, and the like) that include computer usable program code.

This application is described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general purpose computer, a dedicated computer, an embedded processor, or a processor of another programmable data processing device to generate a machine, so that the instructions executed by the computer or the processor of the another programmable data processing device generate an apparatus for implementing a specific function in one or more processes in the flowcharts and/or in one or more blocks in the block diagrams.

These computer program instructions may alternatively be stored in a computer-readable memory that can instruct the computer or the another programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may alternatively be loaded onto the computer or the another programmable data processing device, so that a series of operations and steps are performed on the computer or the another programmable device, to generate computer-implemented processing. Therefore, the instructions executed on the computer or the another programmable device provide steps for implementing a specific function in one or more processes in the flowcharts and/or in one or more blocks in the block diagrams.

Clearly, a person skilled in the art can make various modifications and variations to the embodiments of this application without departing from the spirit and scope of the embodiments of this application. This application is intended to cover these modifications and variations provided that they fall within the scope of protection defined by the following claims and their equivalent technologies.

What is claimed is:

1. An information receiving method performed by a communications apparatus that is, or is applied to, a terminal device, the method comprising: after sending a first message to a network device, receiving first downlink control information (DCI) from the network device, wherein the first DCI comprises first indication information that indicates the network device has successfully demodulated the first message or instructs the terminal device to flush a hybrid automatic repeat request (HARQ) buffer corresponding to the first message; and after receiving the first indication information, determining not to monitor a physical downlink control channel (PDCCH) search space within a first duration after the first DCI, wherein the first duration corresponds to K PDCCH periods, wherein K is a positive integer; wherein the first DCI is one of the following DCI: DCI in format N0, DCI in format N1, DCI in format N1 and used to transmit downlink scheduling information, or DCI in format N1 and used for PDCCH order; and the first DCI further comprises a timing advance.

2. The method according to claim 1, wherein the first duration is determined based on a first proportion value and a second duration.

3. The method according to claim 1, wherein the method further comprises: after sending the first message, starting a timer and starting to monitor the PDCCH search space, wherein a duration of the timer is configured by the network device for the terminal device for monitoring the PDCCH search space, and the first duration is from receiving the first DCI to the timer expiring.

4. An information sending method performed by a communications apparatus that is, or is applied to, a network device, comprising:
after receiving a first message from a terminal device, demodulating the first message; after successfully demodulating the first message, sending first downlink control information (DCI) to the terminal device, wherein the first DCI comprises first indication information that indicates the network device has successfully demodulated the first message or instructs the terminal device to flush a hybrid automatic repeat request (HARQ) buffer corresponding to the first message; and after a first duration after the first DCI is sent to the terminal device, sending a second message to the terminal device, wherein the first duration corresponds to K PDCCH periods, wherein K is a positive integer; wherein the first DCI is one of the following DCI: DCI in format N0, DCI in format N1, DCI in format N1 and used to transmit downlink scheduling information, or DCI in format N1 and used for PDCCH order; and the first DCI further comprises a timing advance.

5. The method according to claim 4, wherein the first duration is determined based on a first proportion value and a second duration.

6. The method according to claim 4, wherein the first duration is between sending the first DCI and ending of a second duration, wherein the second duration is set by the network device for the terminal device for monitoring a PDCCH search space, and the second duration starts from receiving the first message.

7. A communications apparatus, comprising: at least one processor; and one or more memories coupled to the at least one processor and storing programming instructions for execution by the at least one processor to: send a first message to a network device; after sending the first message to the network device, receive first downlink control information (DCI) from the network device, wherein the first DCI comprises first indication information that indicates the network device has successfully demodulated the first message or instructs a terminal device to flush a hybrid automatic repeat request (HARQ) buffer corresponding to the first message; and after receiving the first indication information, determine not to monitor a physical downlink control channel (PDCCH) search space within a first duration after the first DCI, wherein the first duration corresponds to K PDCCH periods, wherein K is a positive integer; wherein the first DCI is one of the following DCI: DCI in format N0, DCI in format N1, DCI in format N1 and used to transmit downlink scheduling information, or DCI in format N1 and used for PDCCH order; and the first DCI further comprises a timing advance.

8. The apparatus according to claim 7, wherein the first duration is determined based on a first proportion value and a second duration.

9. The communications apparatus according to claim 7, wherein the programming instructions additionally include further programming instructions for execution by the at least one processor to: start, a timer and start to monitor a PDCCH search space after sending the first message, wherein a duration of the timer is set by the network device for the terminal device for monitoring the PDCCH search space, and the first duration is from receiving the first DCI to the timer expiring.

10. A communications apparatus, comprising: at least one processor; and one or more memories coupled to the at least one processor and storing programming instructions for execution by the at least one processor to: receive a first message from a terminal device; after receiving the first message from the terminal device, demodulate the first message; after successfully demodulating the first message, send first downlink control information (DCI) to the terminal device, wherein the first DCI comprises first indication information, and the first indication information indicates that the communications apparatus has successfully demodulated the first message or instructs the terminal device to flush a hybrid automatic repeat request (HARQ) buffer corresponding to the first message;
after a first duration after the first DCI is sent to the terminal device, send a second message to the terminal device, wherein the first duration corresponds to K PDCCH periods, wherein K is a positive integer, wherein the first DCI is one of the following DCI: DCI in format N0, DCI in format N1, DCI in format N1 and used to transmit downlink scheduling information, or DCI in format N1 and used for PDCCH order; and the first DCI further comprises a timing advance.

11. The apparatus according to claim 10, wherein the first duration is determined based on a first proportion value and a second duration.

12. The apparatus according to claim 10, wherein the first duration is between sending the first DCI and ending of a second duration that is configured by the network device for the terminal device for monitoring the PDCCH search space, wherein the second duration starts from receiving the first message.

* * * * *

UNITED STATES PATENT AND TRADEMARK OFFICE
CERTIFICATE OF CORRECTION

PATENT NO. : 12,279,291 B2
APPLICATION NO. : 17/401560
DATED : April 15, 2025
INVENTOR(S) : Xiang Mi et al.

Page 1 of 1

It is certified that error appears in the above-identified patent and that said Letters Patent is hereby corrected as shown below:

In the Claims

In Column 32, Claim 1, Line 51, delete "message; and" and insert -- message; --, therefor.

In Column 33, Claim 4, Lines 15-16, delete "message; and" and insert -- message; --, therefor.

In Column 33, Claim 7, Line 45, delete "message; and" and insert -- message; --, therefor.

In Column 34, Claim 9, Line 12, delete "start," and insert -- start --, therefor.

In Column 34, Claim 10, Line 35, delete "integer," and insert -- integer; --, therefor.

Signed and Sealed this
Fifteenth Day of July, 2025

Coke Morgan Stewart
*Acting Director of the United States Patent and Trademark Office*